United States Patent
Horst et al.

(10) Patent No.: US 12,358,546 B2
(45) Date of Patent: Jul. 15, 2025

(54) COMPACT FOLDABLE STROLLER

(71) Applicant: Wonderland Switzerland AG, Steinhausen (CH)

(72) Inventors: Andrew J. Horst, Morgantown, PA (US); Daniel A. Sack, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 240 days.

(21) Appl. No.: 17/928,913

(22) PCT Filed: Jun. 1, 2021

(86) PCT No.: PCT/US2021/035106
§ 371 (c)(1),
(2) Date: Nov. 30, 2022

(87) PCT Pub. No.: WO2021/247472
PCT Pub. Date: Dec. 9, 2021

(65) Prior Publication Data
US 2023/0219612 A1    Jul. 13, 2023

Related U.S. Application Data

(60) Provisional application No. 63/032,826, filed on Jun. 1, 2020.

(51) Int. Cl.
*B62B 7/06*    (2006.01)
*B62B 7/10*    (2006.01)
(Continued)

(52) U.S. Cl.
CPC ............... *B62B 7/10* (2013.01); *B62B 7/062* (2013.01); *B62B 7/064* (2013.01); *B62B 7/145* (2013.01); *B62B 9/102* (2013.01); *B62B 9/20* (2013.01)

(58) Field of Classification Search
CPC ........... B62B 7/10; B62B 7/062; B62B 7/064; B62B 7/145; B62B 9/102; B62B 9/20
See application file for complete search history.

(56) References Cited

U.S. PATENT DOCUMENTS

| 6,102,431 A | 8/2000 | Sutherland et al. |
| 8,087,689 B2 | 1/2012 | Fritz et al. |

(Continued)

FOREIGN PATENT DOCUMENTS

| CN | 2905587 Y | 5/2007 |
| CN | 102069831 A | 5/2011 |

(Continued)

OTHER PUBLICATIONS

"Partial Supplementary European Search Report Issued in Corresponding European Patent Application No. 21818995.9", Mailed Date: Jul. 10, 2024, 12 pages.

(Continued)

*Primary Examiner* — John D Walters
(74) *Attorney, Agent, or Firm* — Volpe Koenig

(57) ABSTRACT

A collapsible or foldable stroller frame is disclosed herein. The stroller frame is configured to be folded into a compact size using a series of connections between a handle portion, front leg portion, and rear leg portion. In one aspect, a basket assembly is also provided that is attached to the stroller frame and is configured to fold into a perimeter defined by the folded stroller frame. In another aspect, an adaptor assembly is provided that allows for a connection or support interface between a carrier and the stroller frame.

14 Claims, 35 Drawing Sheets

(51) Int. Cl.
    *B62B 7/14*          (2006.01)
    *B62B 9/10*          (2006.01)
    *B62B 9/20*          (2006.01)

(56) References Cited

U.S. PATENT DOCUMENTS

| | | |
|---|---|---|
| 8,517,412 B2 | 8/2013 | Tsai et al. |
| 8,696,015 B2 | 4/2014 | Karremans et al. |
| 8,991,854 B2 | 3/2015 | Greger et al. |
| 9,199,658 B2 | 12/2015 | Chuah |
| 9,308,929 B1 | 4/2016 | Dowd et al. |
| 9,415,790 B2 * | 8/2016 | Driessen ............... B62B 7/062 |
| 9,561,816 B2 | 2/2017 | Dowd et al. |
| 9,637,154 B2 | 5/2017 | Liu |
| 9,815,487 B2 | 11/2017 | Dowd et al. |
| 9,981,678 B1 | 5/2018 | Chen |
| 10,023,218 B2 * | 7/2018 | Paxton ................... B62B 7/142 |
| 10,155,528 B2 | 12/2018 | Zhong et al. |
| 2010/0244408 A1 * | 9/2010 | Dean ....................... B62B 7/142 403/103 |
| 2013/0154215 A1 | 6/2013 | Thomas et al. |
| 2014/0361589 A1 | 12/2014 | Hou et al. |
| 2015/0042056 A1 | 2/2015 | Sparling |
| 2015/0076774 A1 | 3/2015 | Sclare |
| 2015/0076794 A1 | 3/2015 | Driessen |
| 2017/0282952 A1 | 10/2017 | Yi |
| 2017/0334476 A1 | 11/2017 | Paxton et al. |
| 2018/0065654 A1 | 3/2018 | Chen |
| 2020/0216106 A1 | 7/2020 | Hartenstine et al. |

FOREIGN PATENT DOCUMENTS

| | | |
|---|---|---|
| CN | 203996350 U | 12/2014 |
| CN | 104986209 A | 10/2015 |
| CN | 105035147 A | 11/2015 |
| CN | 105151104 A | 12/2015 |
| CN | 205469212 U | 8/2016 |
| CN | 105923036 A | 9/2016 |
| CN | 205769518 U | 12/2016 |
| CN | 107618558 A | 1/2018 |
| CN | 109131519 A | 1/2019 |
| CN | 110329334 A | 10/2019 |
| WO | 2012027795 A1 | 3/2012 |
| WO | 2017210929 A1 | 12/2017 |

OTHER PUBLICATIONS

International Search Report and Written Opinion for PCT/US2021/035106 dated Oct. 20, 2021.

* cited by examiner

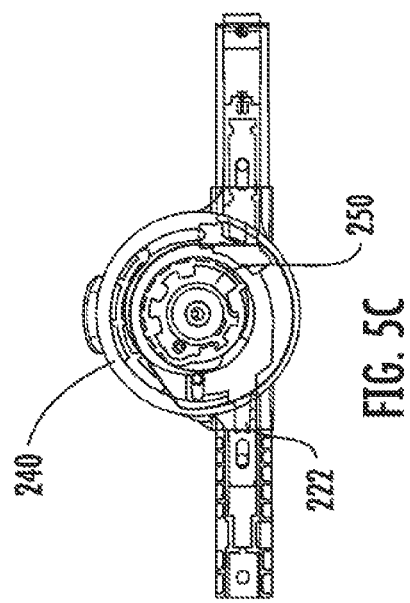
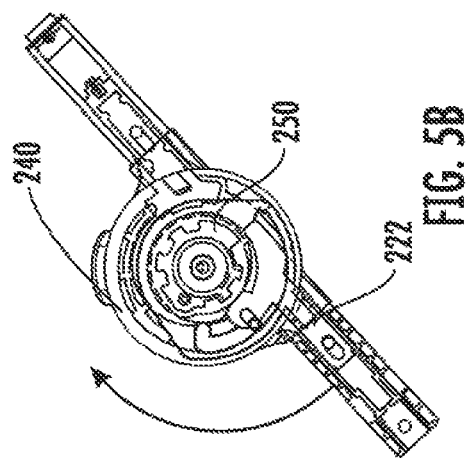
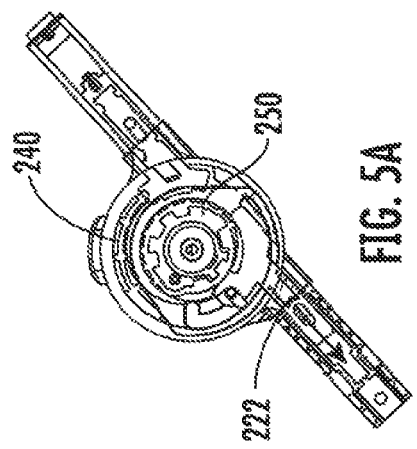

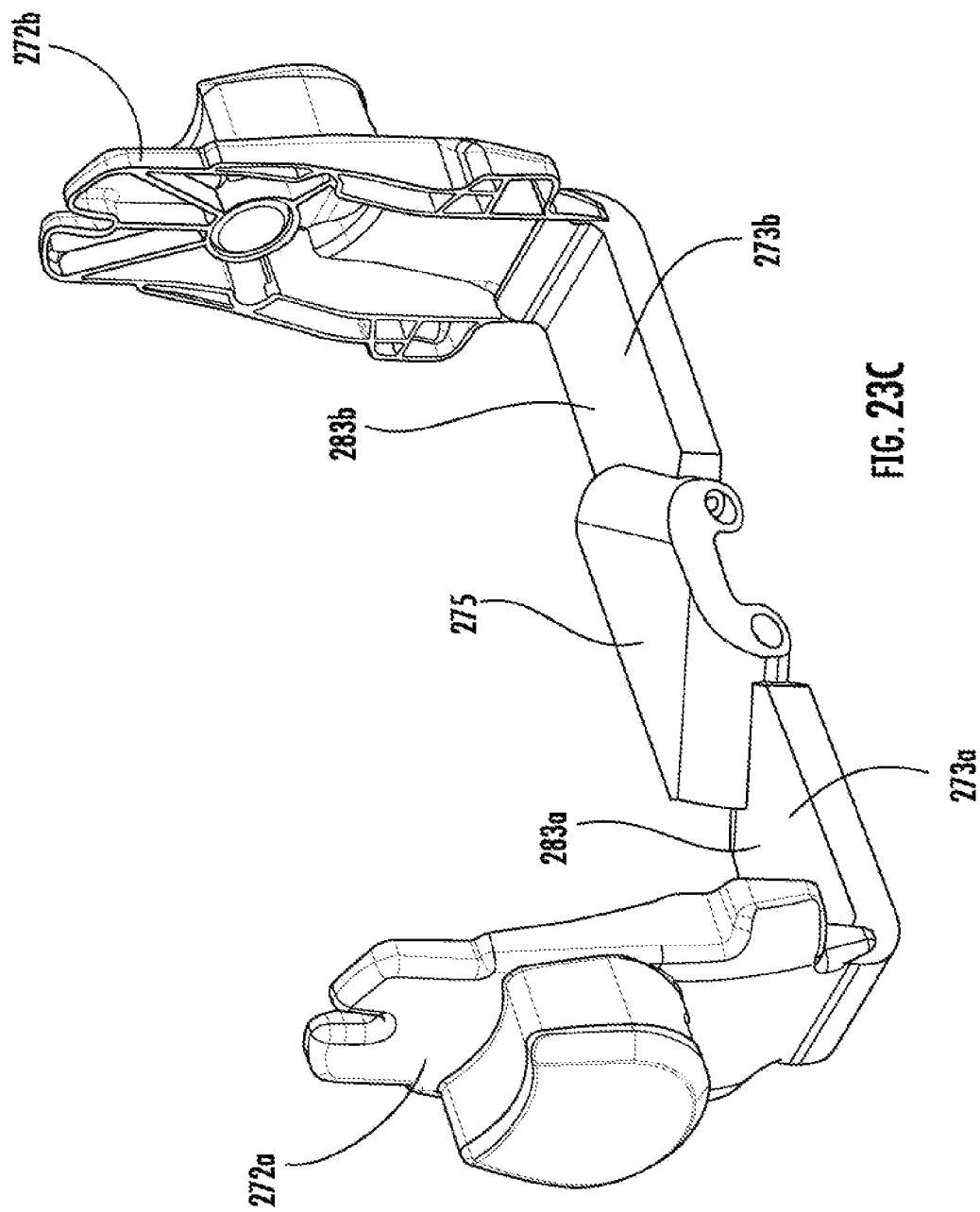

COMPACT FOLDABLE STROLLER

CROSS-REFERENCE TO RELATED APPLICATION

This application is a 371 National Stage filing of International Application No. PCT/US2021/035106, filed Jun. 1, 2021, which claims priority to U.S. Provisional Application No. 63/032,826, filed Jun. 1, 2020, the disclosures of which are hereby incorporated by reference as if set forth in their entirety herein.

TECHNICAL FIELD

The present invention generally relates to strollers used to transport infants, toddlers, or children. More particularly, the invention relates to strollers capable of folding to a compact size while still allowing for multiple seating modes.

BACKGROUND

Existing strollers generally allow a child seat or carrier to be attached to a stroller frame in multiple configurations, and/or are collapsible, i.e. capable of being folded to a smaller size. It is desirable to provide a collapsing feature for a stroller for the initial packaging of the stroller, as well as transportation of the stroller by the caregiver. It is highly desirable to reduce the overall size of the folded or collapsed stroller in order to minimize the spaced needed to package and store the stroller. Typically, strollers that are capable of being folded do not include a full range of features associated with the child seat or the stroller frame, or may include smaller wheel assemblies that are not suitable for uneven terrain. Providing multiple configurations for a stroller is also desirable because it allows a caregiver to adapt a single stroller frame to various configurations, depending on the particular age or needs of the child.

There exists a need for a stroller that provides multiple configurations or seating modes for the child, and is also collapsible and compact.

SUMMARY

The present disclosure is directed to a collapsible or foldable stroller frame, in one aspect. The stroller frame includes a series of connections, linkages, assemblies, and frame members that provide for a compact package when the stroller frame is folded. A basket assembly is also provided that generally extends cantilevered in a rear direction from the stroller frame when in the upright position. The entire stroller frame assembly, including the basket assembly, is foldable into a compact size.

In one aspect, a foldable stroller frame assembly is provided. The foldable stroller frame assembly includes a handle portion, a front leg portion, and a rear leg portion each pivotally connected to one another by a central frame hub. A seat mount is connected in a first portion of the seat mount to the central frame hub and is connected in a second portion of the seat mount to a linkage connector. A seat mount guide link has a first end connected to the front leg portion and a second end connected to the linkage connector. A basket guide link has a first end connected to the linkage connector.

An adaptor assembly is also disclosed herein that is configured to allow a child or infant carrier to be mounted onto a stroller. The adaptor assembly includes a vertical support body including a receptacle configured to receive a portion of a stroller. The vertical support body further includes a latching region configured to receive a carrier plunger. A control member is attached to the vertical support body and provides support for the adaptor assembly relative to the carrier. The control member prevents outward splaying of the vertical support body and ensures that the latching region remains securely engaged with the carrier plunger.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIGS. 5A-5C illustrate side cross-sectional views of a seat mount bub in a variety of positions.

FIG. 23C is a perspective view of the adaptor assembly of FIGS. 23A and 23B.

DETAILED DESCRIPTION

Figure 1:
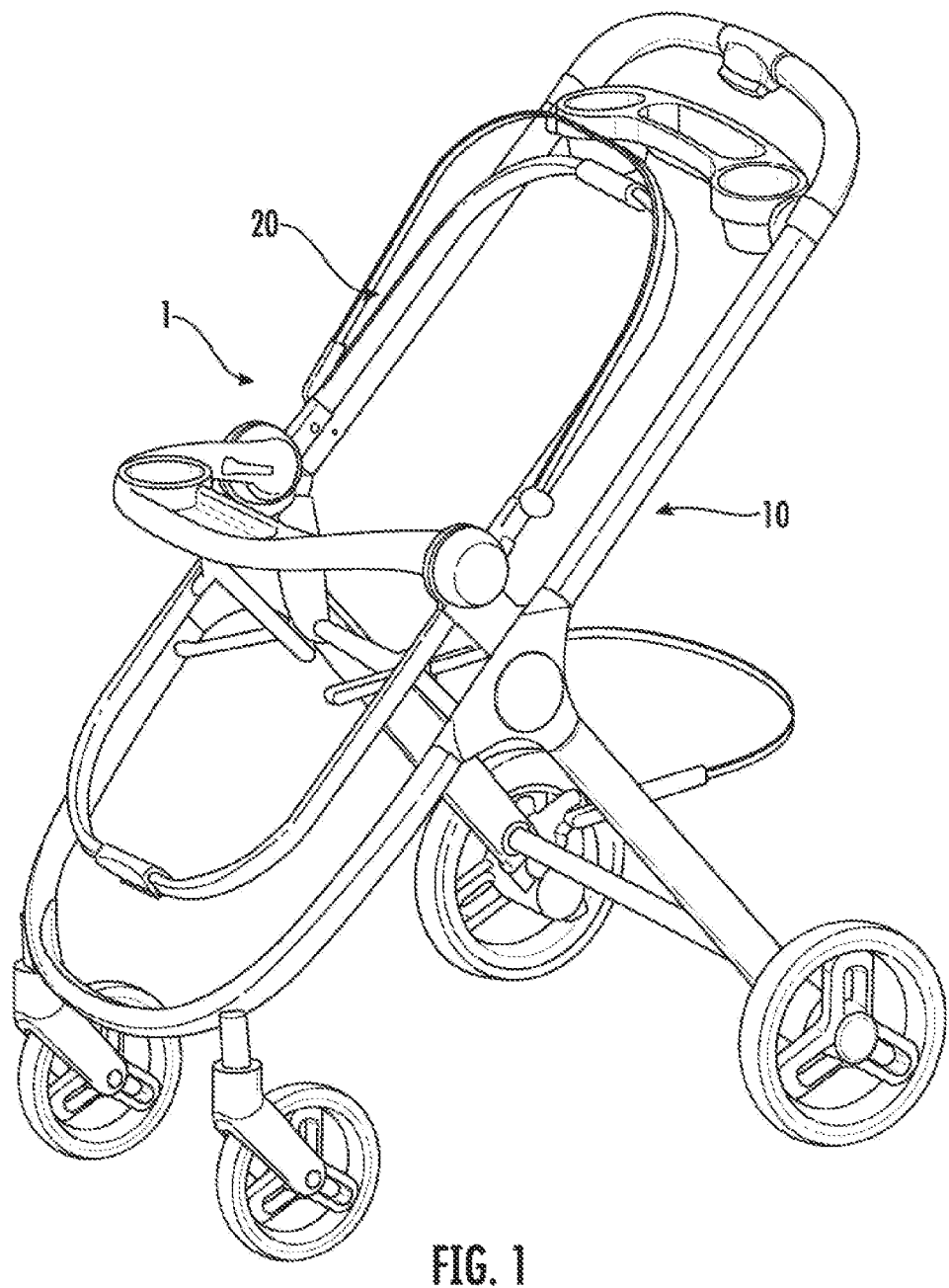
FIG. 1 is a perspective view of a stroller according to one aspect.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and e represent the items being listed) means any single one of the items a, b, or c, or combinations thereof. This terminology includes the words specifically noted above, derivatives thereof and words of similar import.

As shown in FIG. 1, a foldable stroller assembly 1 (hereinafter referred to as "stroller") is disclosed that includes a stroller frame 10 that is configured to accommodate child seat frames 20 of various configurations. The stroller frame 10 and the child seat frame 20 are both foldable, as described in more detail herein. Details regarding certain aspects of the stroller assembly are also disclosed in PCT Applications PCT/EP2020/083512 and PCT/IB2020/061218, which are both incorporated by reference in their entirety as if fully set forth herein.

As shown in FIGS. 2 and 3A-3D, one configuration of the child seat frame 20 may include an upper frame 210, a lower frame 220, a child tray 230, and a seat mount 240, which is also referred to herein as a seat hub. The upper frame 210 and the lower frame 220 are pivotally connected to the seat mount 240 through an upper seat frame hub 211 and a lower seat frame bub 221, respectively. The child tray 230 is also pivotally connected to the seat mount 240 through a child tray hub 231. The lower frame 220 can include a second latch portion 224 and a lower frame plunger 222. In one aspect, the second latch portion 224 provides an interface between the lower frame 220 and other components, such as the lower seat frame hub 221 and the lower frame plunger 222.

Figure 4A:
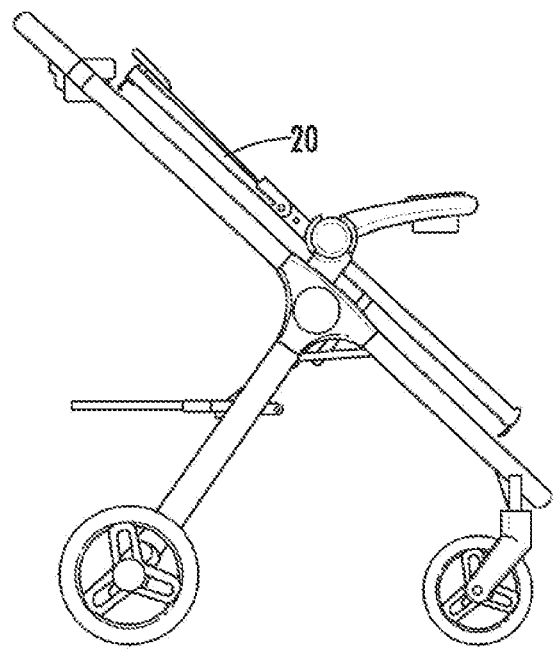
FIG. 4A is a side view of the stroller assembly with the seat frame assembly in a seat mode.
Figure 4B:
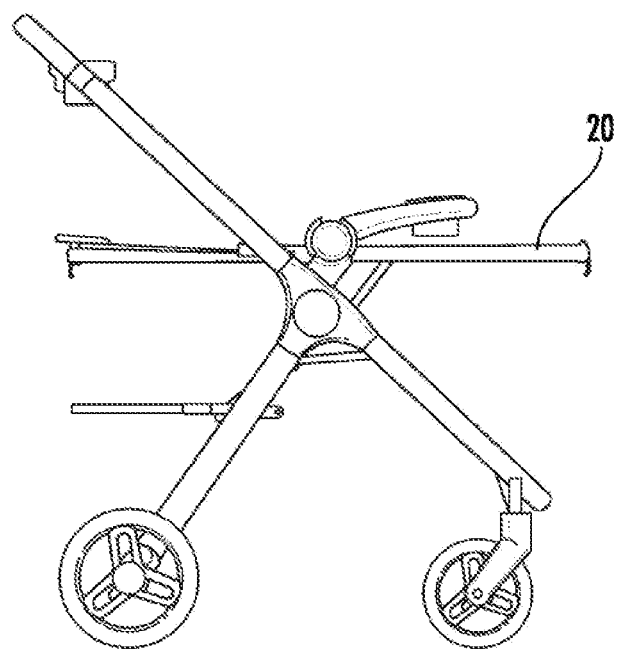
FIG. 4B is a side view of the stroller assembly with the seat frame assembly in a bassinet mode.

Referring to FIGS. 4A and 4B, the child seat frame 20 may have a seat mode and a cradle mode. One configuration for attaching the child seat frame 20 to the main stroller frame 10 is in a forward facing seat position. In another aspect, the child seat frame 20 can be supported on the stroller frame 10 in a rearward facing seat position. One of ordinary skill in the art would understand that additional configurations of the child seat frame 20 relative to the stroller frame 10 are possible.

Figure 2:
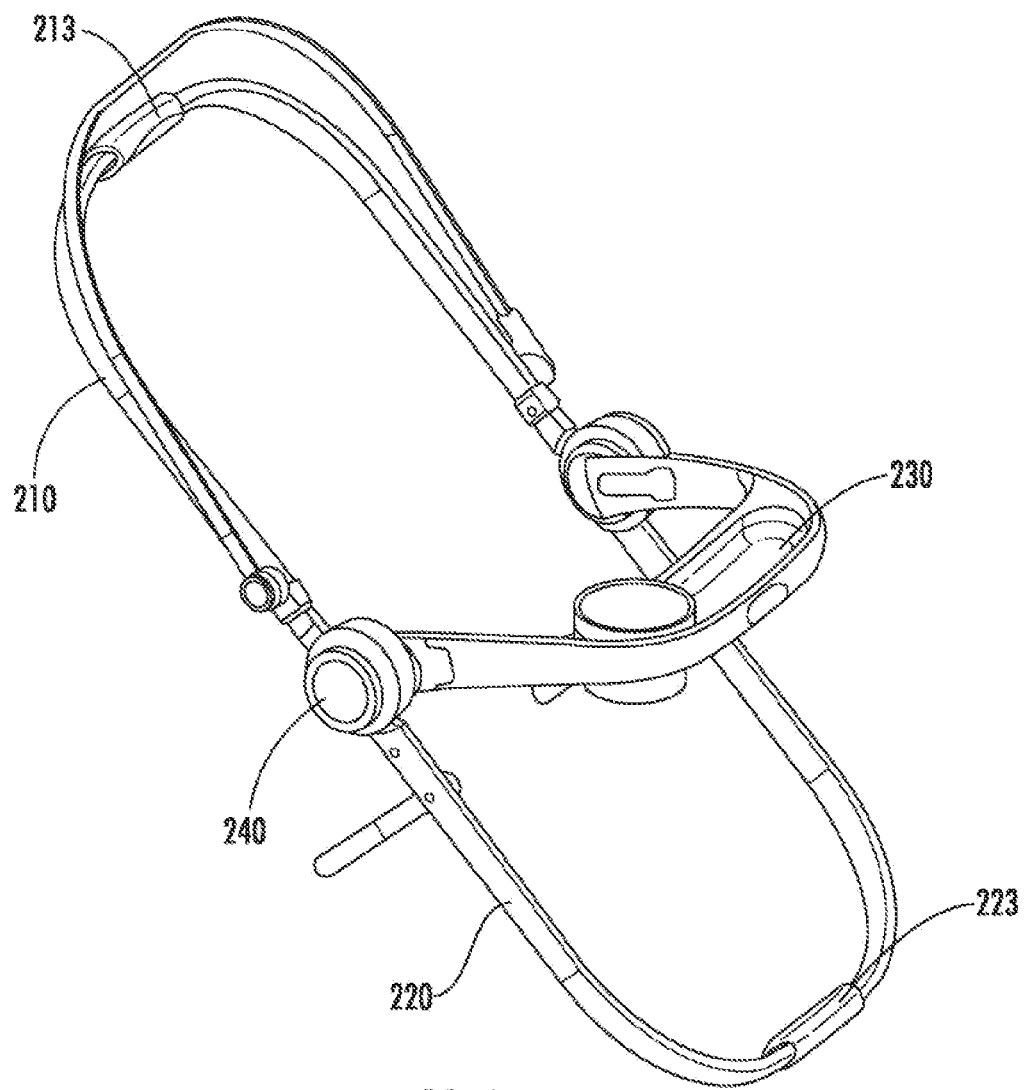
FIG. 2 is a perspective view of a seat frame assembly configured for use with the stroller of FIG. 1.

In the seat mode, which is shown in FIG. 2 prior to attachment to the main stroller frame 10 and in FIG. 4A, the upper frame 210 may extend upward from the seat mount 240, specifically, obliquely extending backward and upward, and the lower frame 220 may extend downward from the seat mount 240, specifically, obliquely extending forward and downward. In the upright state, the upper frame 210 and the lower frame 220 extend in a straight line that passes through the seat mount 240. In the cradle mode, shown in FIG. 4B, the upper frame 210 and the lower frame 220 extend horizontally from both sides of the seat mount 240. The child seat frame 20 can be converted from the seat mode position to the bassinet mode position as shown in FIGS. 4A and 4B.

Referring to FIGS. 5A-5C, in order to convert the child seat frame 20 from the seat mode to the cradle mode, the user may engage a recline handle 223, which is shown in FIG. 2, which can use a cable to retract the spring-loaded lower frame plunger 222 out of engagement with the seat mount 240. This allows the entire child seat frame 20 to rotate to a horizontal position relative to the seat mount 240, and re-engages the spring-loaded lower frame plunger 222 with the seat mount 240 to lock the child seat frame 20 in this position. One of ordinary skill in the art would understand that other types of recline handles or actuators may be implemented with the child seat frame 20.

Figure 6:
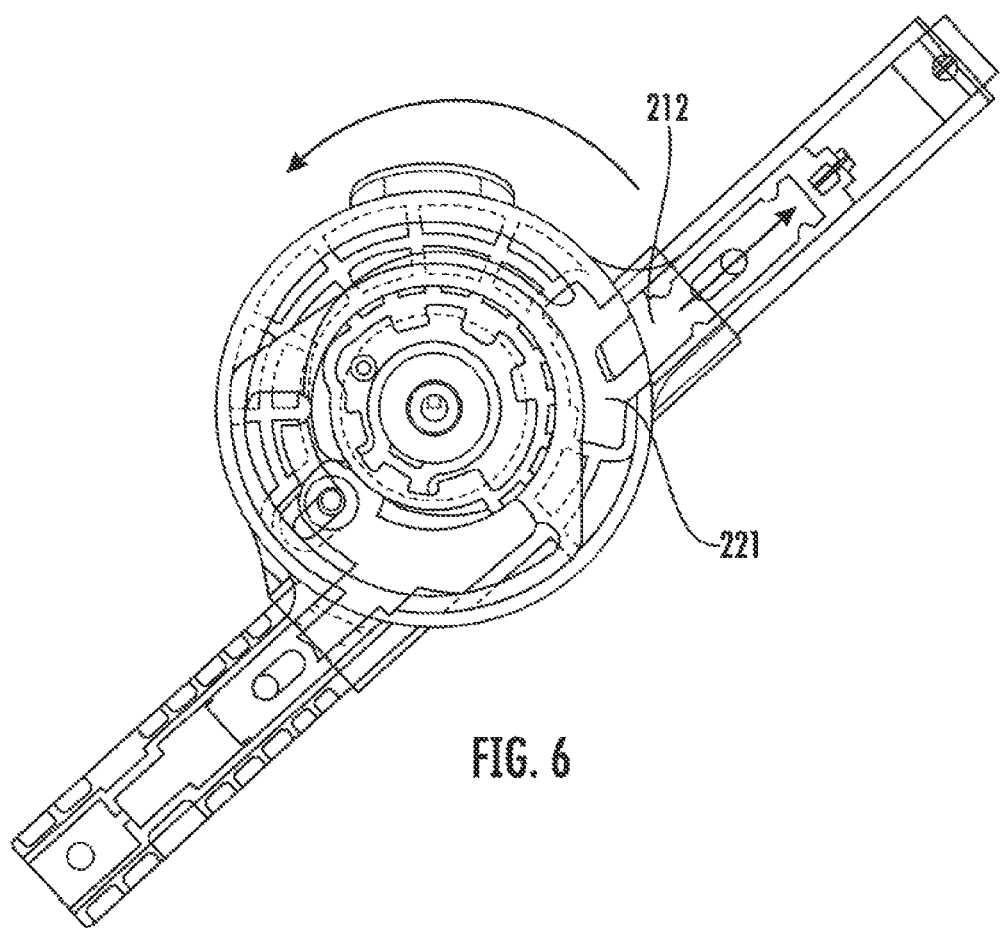
FIG. 6 is a side cross-sectional view of the seat mount hub with an upper frame plunger in a retracted state.

In addition to the reclining handle 223, the child seat frame 20 also includes a fold handle 213, which is shown in FIG. 2, for folding the child seat frame 20 as a part of the folding of the stroller. When the fold handle 213 is engaged, it retracts a spring-biased upper frame plunger 212 from its engagement position with the lower seat frame hub 221, as shown in FIG. 6. The upper frame 210 (i.e. the upper seat frame) can then rotate around the seat mount 240 relative to the lower frame 220 (i.e. the lower seat frame). The fold handle 213 can use a cable in order to retract the spring-biased upper frame plunger 212. One of ordinary skill in the art would understand that other types of folding handles or actuators may be implemented with the child seat frame 20.

Figure 7B:
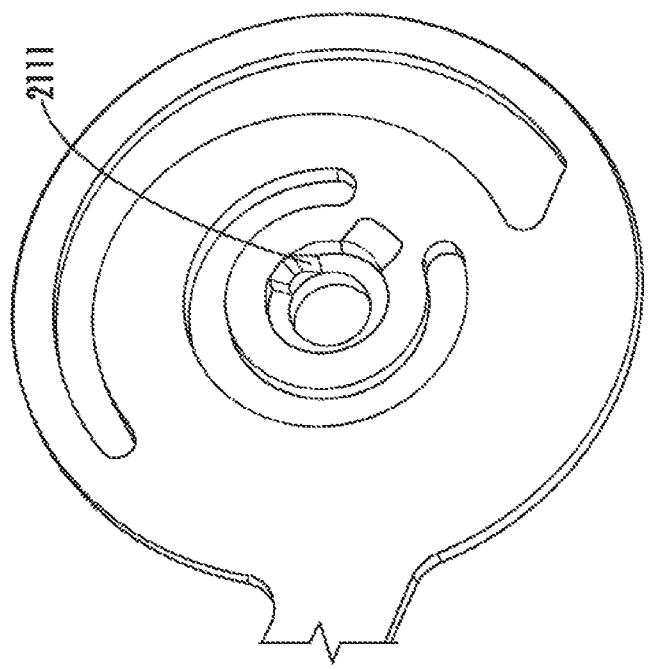
FIG. 7B is a perspective view of a ramped surface on an upper seat frame hub.
Figure 7A:
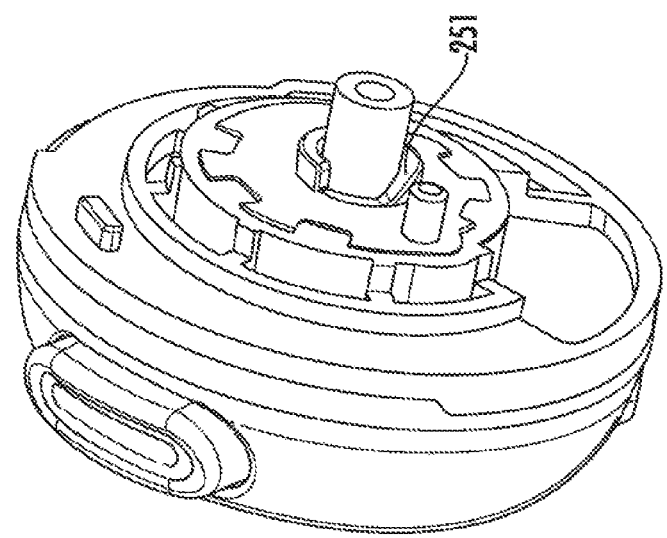
FIG. 7A is a perspective view of a ramped surface of a latch pin assembly of the seat mount hub.

FIG. 7A illustrates a ramped surface 251 on a latch pin assembly 250, and FIG. 7B illustrates a corresponding ramped surface 2111 on the upper seat frame hub 211. When the upper frame 210 rotates, the ramped surface 2111 on the upper seat frame hub 211 acts on the ramped surface 251 on the latch pin assembly 250 to press the latch pin assembly 250 into the seat mount 240, and separate the latch pin assembly 250 from the child tray hub 231, thereby releasing the child tray 230 such that the child tray 230 can pivot freely around the seat mount 240. One of ordinary skill in the art would recognize based on the present disclosure that other configurations or arrangements can be provided in order to disengage the latch pin assembly 250 from the child tray hub 231.

Figure 3C:
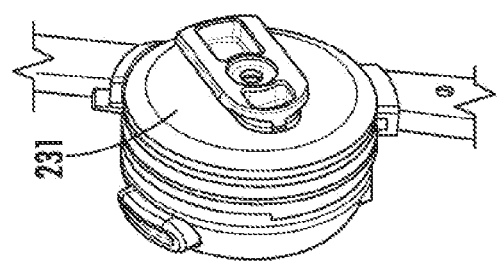
FIG. 3C is a perspective view of a tray hub of the seat frame assembly.
Figure 3B:
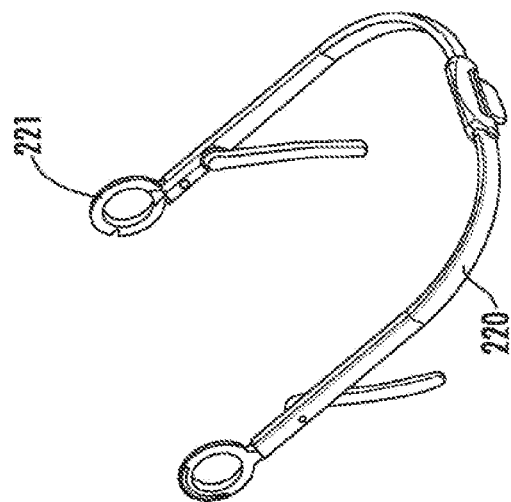
FIG. 3B is a perspective view of a lower frame of the seat frame assembly.
Figure 3A:
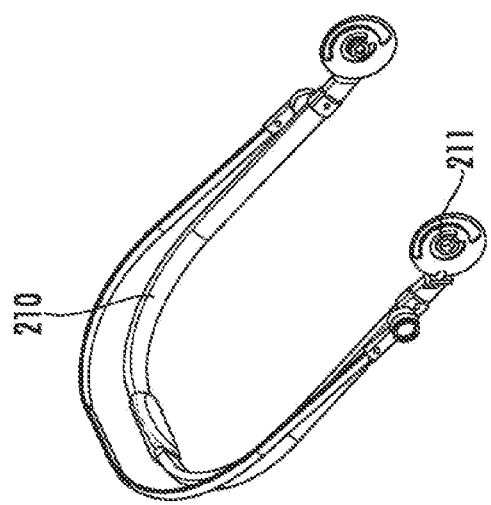
FIG. 3A is a perspective view of an upper frame of the seat frame assembly.
Figure 3D:
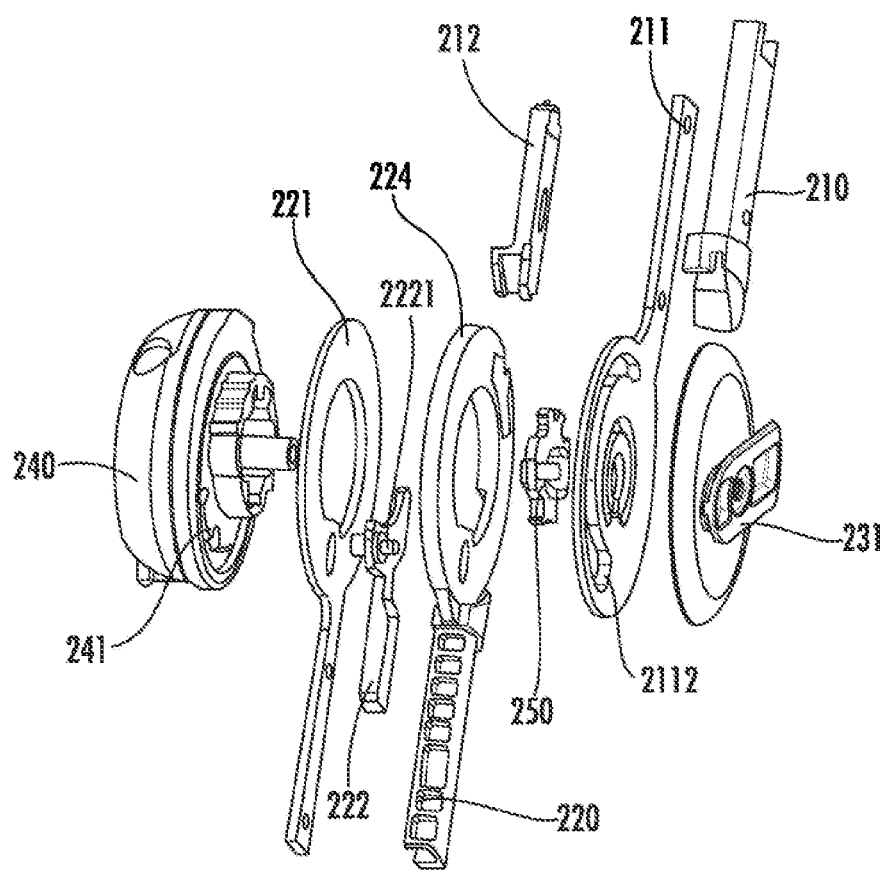
FIG. 3D is an exploded view of a central hub assembly of the stroller.
Figure 8A:
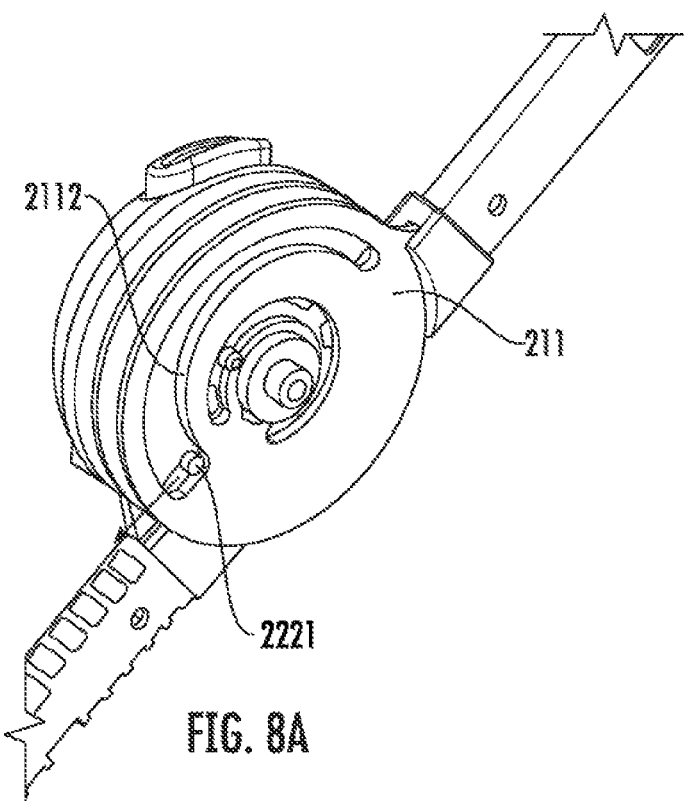
FIG. 8A is a perspective view of an interface between a lower frame plunger guide post and the upper seat frame hub in a first position.
Figure 8B:
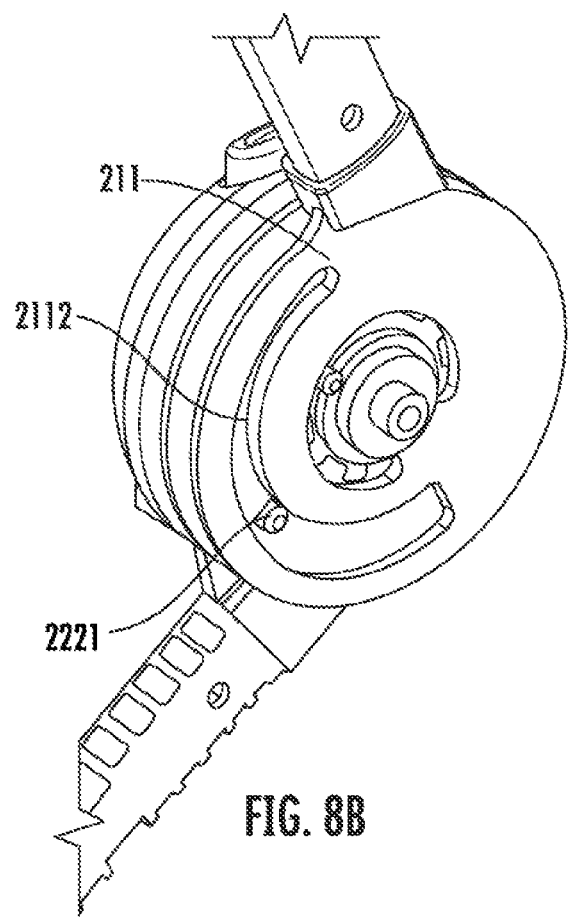
FIG. 8B is a perspective view of the interface between the lower frame plunger guide post and the upper seat frame hub in a second position.

Referring to FIGS. 8A and 8B, a spiral control surface 2112 is provided on the upper seat frame hub 211 and is configured to unlock the lower seat frame hub 221 from the seat mount 240, which is shown in FIG. 3D, by acting on a lower frame plunger guide post 2221. This allows the lower frame 220 to rotate around the seat mount 240 to a relatively vertical (i.e. downward) position with respect to the seat mount 240. In one aspect, a locked state is provided between the seat mount 240 and the lower seat frame hub 221 such that the lower seat frame bub 221 is rotationally fixed relative to the seat mount 240. In one aspect, an unlocked state is provided between the seat mount 240 and the lower seat frame hub 221 in which the spiral control surface 2112 acts on the lower frame plunger guide post 2221 to unlock the lower seat frame hub 221 relative to the seat mount 240 so that the lower seat frame hub 221 is rotatable relative to the seat mount 240. Further details regarding the locked and unlocked states for this configuration are provided herein.

The spiral control surface 2112 is formed with a tapered or ramped profile that tapers or ramps radially outward from a center of the upper seat frame hub 211 between circumferential terminal ends of the spiral control surface 2112, so that when the upper seat frame hub 211 rotates relative to the seat mount 240, the spiral control surface 2112 abuts against and drives the lower frame plunger guide post 2221.

The seat mount 240 includes a recess, which may be formed by a first latch portion 241, that is configured to receive the lower frame plunger guide post 2221 to rotationally fix the seat mount 240 with the lower seat frame bub 221. While the term first latch portion 241 is used to define a recess on the seat mount 240, other types of slots, pockets, receptacles, etc., may be formed on the seat mount 240 that are dimensioned to receive at least a portion of the lower frame plunger guide post 2221.

The lower frame plunger guide post 2221 is biased towards a locked position in the recess of the seat mount 240 via a spring, in one example. In one aspect, the spring can be engaged against the lower frame plunger 222. Other arrangements can be used to bias the lower frame plunger guide post 2221 into the recess of the seat mount 240. The lower frame plunger guide post 2221 is configured to be selectively driven away from the recess of the seat mount 240 to allow the lower seat frame hub 211 to rotate relative to the seat mount 240. In one aspect, the lower frame plunger 222, which is formed with the lower frame plunger guide post 2221, either drives the lower frame plunger guide post 2221 towards or away from the recess of the seat mount 240 along an axis of the lower frame 220. The lower frame plunger 222 is rotationally fixed to the lower frame 220 such that any rotation of the lower frame 220 also causes the lower frame plunger 222 to rotate.

The upper seat frame hub 211 may be formed with a driving slot (i.e. the slot forming the spiral control surface 2112 as shown in FIGS. 8A and 8B), and the lower frame plunger 222 is formed with the lower frame plunger guide post 2221 which can be movably arranged in the driving slot. The driving slot is generally arc-shaped and may have a certain angle range, for example, less than 180°. In one aspect, the angle range of the driving slot is at least 120°.

The lower frame plunger guide post 2221 abuts against the spiral control surface 2112, and when the upper seat frame hub 211 rotates, the spiral control surface 2112 can actuate the lower frame plunger 222 so as to selectively transition the lower frame 220 between a locked state, wherein the lower frame 220 is rotationally fixed relative to the seat mount 240, and an unlocked state, wherein the lower frame 220 is rotatable relative to the seat mount 240. Based on this arrangement, rotation of the upper seat frame hub 211 causes the lower frame 220 to transition between the locked and unlocked states. In one aspect, forward rotation (i.e. clockwise rotation as shown in FIGS. 8A and 8B) of the upper seat frame hub 211 causes an unlocking state between the lower frame 220 and the seat mount 240. Further, the spring that engages the lower frame plunger guide post 2221 can bias the lower frame plunger guide post 2221 towards the locked state such that, when the upper seat frame hub 211 is rotated in the opposite direction (i.e. counterclockwise rotation as viewed in FIGS. 8A and 8B), the spring drives the lower frame plunger guide post 2221 to the locked state.

The spiral control surface 2112 may be configured to unlock the lower frame 220 from the seat mount 240 after the upper seat frame hub 211 is rotated by a predetermined angle. One of ordinary skill in the art would recognize that a width of the slot forming the spiral control surface 2112 can be uniform. Alternatively, a width of the slot forming the spiral control surface 2112 may be non-uniform. One of ordinary skill in the art would recognize that the profile of the slot forming the spiral control surface 2112 can vary.

When the upper frame 210 extends away from the lower frame 220, the lower frame plunger guide post 2221 is located in a wider portion of the driving slot, as shown in FIG. 8A. When the upper frame 210 is gradually rotated towards the lower frame 220, the slot width of the driving slot is gradually reduced or narrowed due to the shape of the spiral control surface 2112. As the upper frame 210 approaches the lower frame 220, rotation of the spiral control surface 2112 drives the lower frame plunger guide post 2221 gradually away from the center of the upper seat frame hub 211. When the upper frame 210 and the lower frame 220 move close to each other, the lower frame plunger guide post 2221 is located at a position of the driving slot having a narrower slot width. During this phase, the lower frame plunger guide post 2221 becomes disengaged from the first latch portion 241 of the seat mount 240 so that the lower seat frame 220 and the upper frame 210 can pivot relative to the seat mount 240 and fold towards each other. Based on this configuration, the lower frame plunger guide post 2221 of the lower frame plunger 222 is selectively displaced or moved such that it is engaged or disengaged relative to the first latch portion 241.

One of ordinary skill in the art would understand based on the present disclosure that other arrangements can be used or implemented in the child seat frame 20 besides the lower frame plunger guide post 2221 and the spiral control surface 2112 that are capable of translating rotational movement imparted onto one component (i.e. the upper frame 210) into lateral displacement of another component (i.e. the lower frame plunger guide post 2221 of the lower frame plunger 222), such that one or more parts of the child seat frame 20 become locked or unlocked relative to the seat mount 240.

Figure 9A:
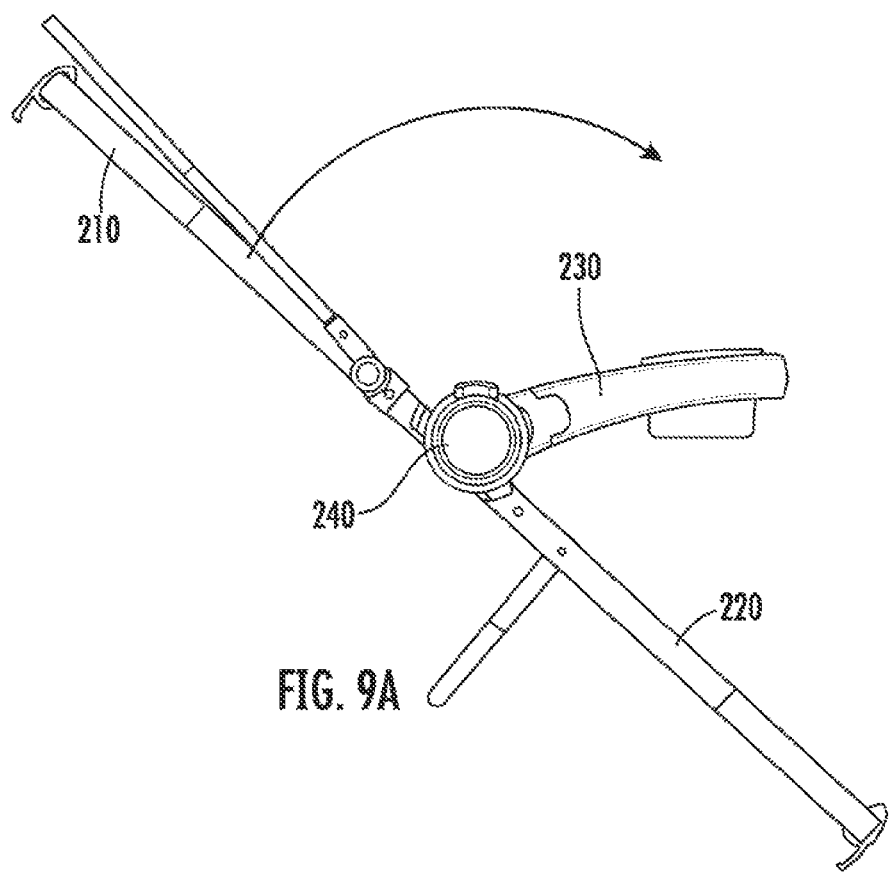
FIG. 9A is a side view of the seat frame assembly in the seat mode.
Figure 9B:
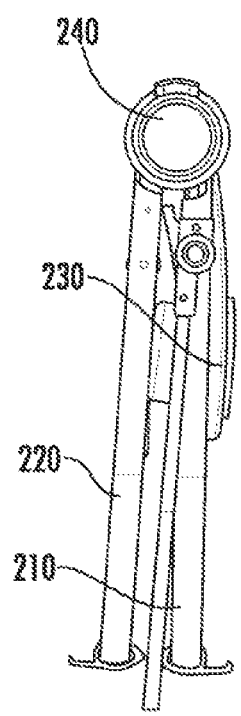
FIG. 9B is a side view of the seat frame assembly in a folded mode.

FIGS. 9A and 9B illustrate bow the upper frame 210, the lower frame 220 and the child tray 230 are each configured to be driven from an extended state (i.e. seat mode in FIG. 9A) to a folded state (shown in FIG. 9B) by pivoting the upper frame 210, the lower frame 220 and the child tray 230 downwards from the seat mount 240 such that the upper frame 210, the lower frame 220 and the child tray 230 are generally arranged parallel to each other in the folded state.

Figure 10:
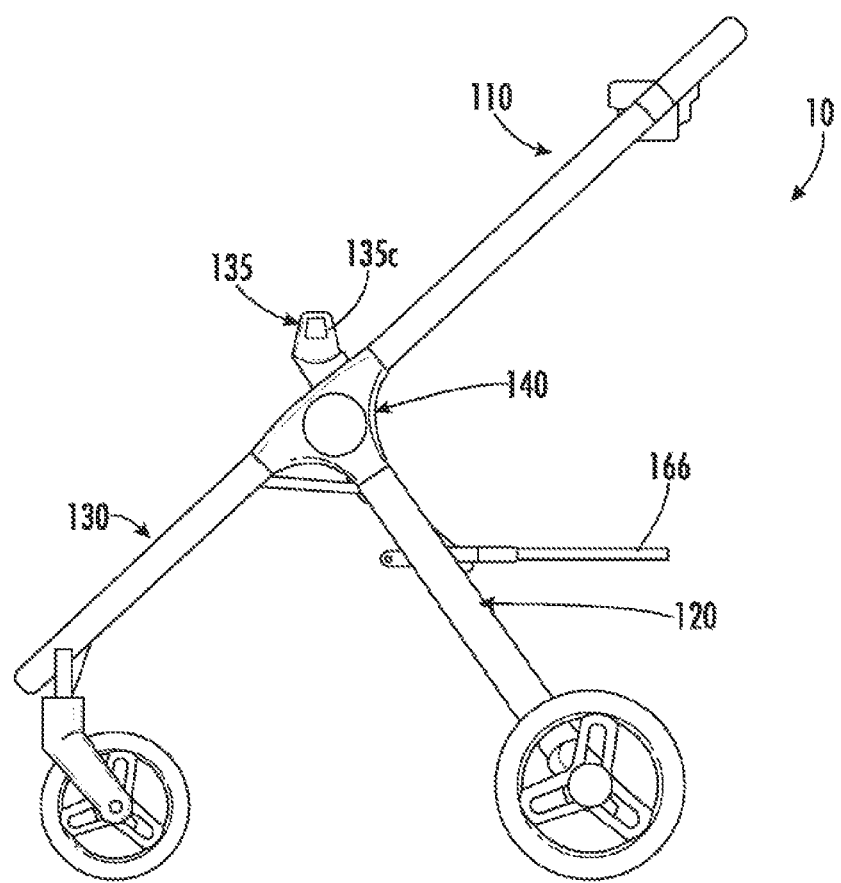
FIG. 10 is a side view of a stroller frame according to one aspect.

As shown in FIG. 10, in one aspect, a stroller frame 10 is disclosed that generally comprises a handle portion 110, a rear leg portion 120, and a front leg portion 130. The stroller frame 10 is illustrated in a use state (i.e. upright state) in FIG. 10, with the handle portion 110 oriented generally upward and the rear leg portion 120 and the front leg portion 130 fully extended.

Figure 15A:
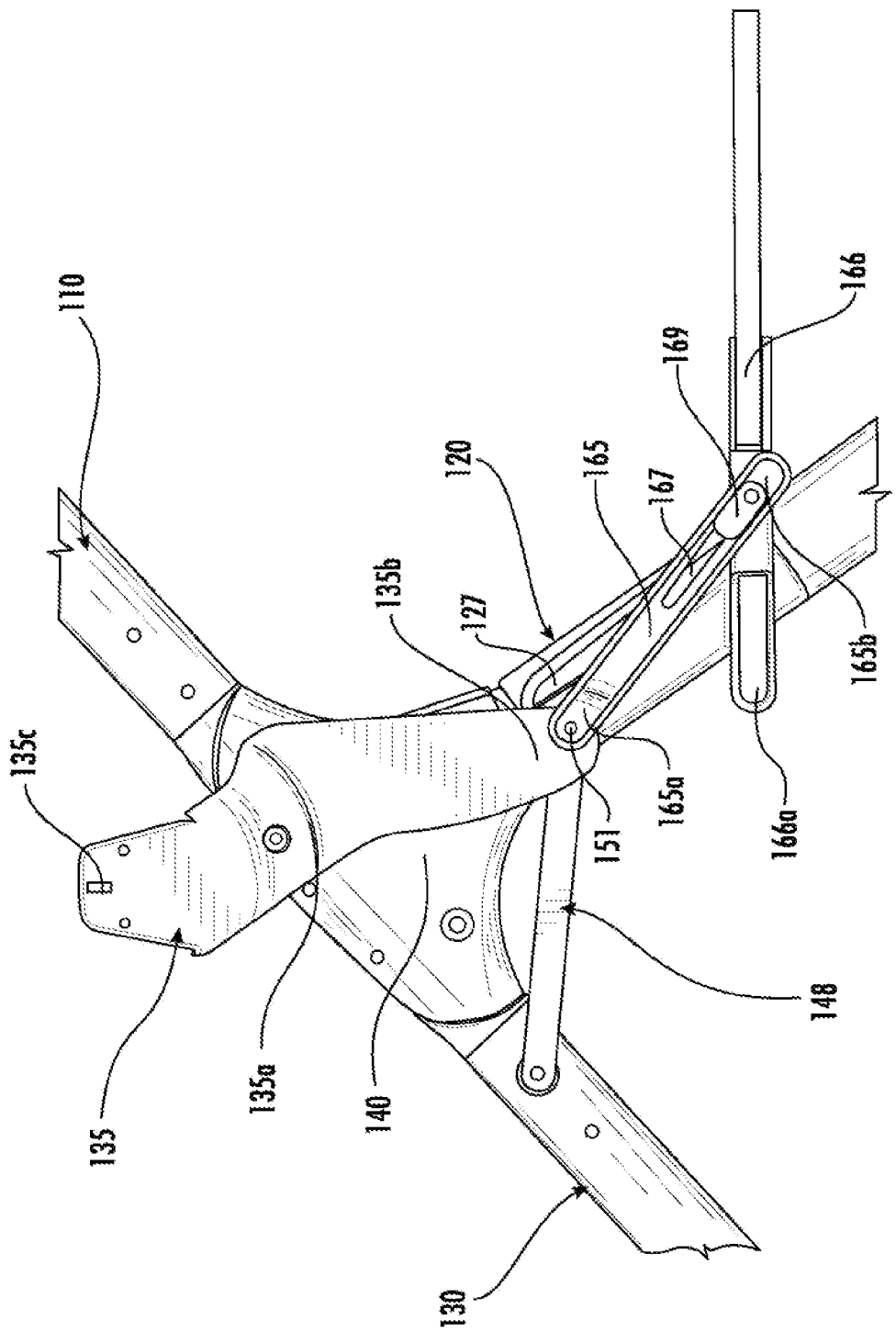
FIG. 15A is a side view of the seat mount, the central frame hub, and a basket assembly.

The handle portion 110 and the front leg portion 130 can be maintained in a straight-line configuration in the use state. In other configurations, the handle portion 110 and front leg portion 130 can be offset from one another. Each of the handle portion 110, the rear leg portion 120, and the front leg portion 130 are pivotally connected to one another at a central frame hub 140. A seat mount 135 is attached to the central frame hub 140, and generally extends vertically and cantilevered from the central frame hub 140. An upper portion of the seat mount 135 includes a bayonet 135c, which is configured to engage with another element, such as an infant or child carrier or car seat. In one aspect, the bayonet 135c is not in direct vertical alignment with a remainder of the seat mount 135 and instead the bayonet 135c is angled or offset from a remainder of the seat mount 135, as shown in FIG. 15A. In one aspect, the bayonet 135c is configured to engage within a receptacle of the seat mount 240 in order to attach the seat frame 20 to the stroller frame 10.

Figure 11A:
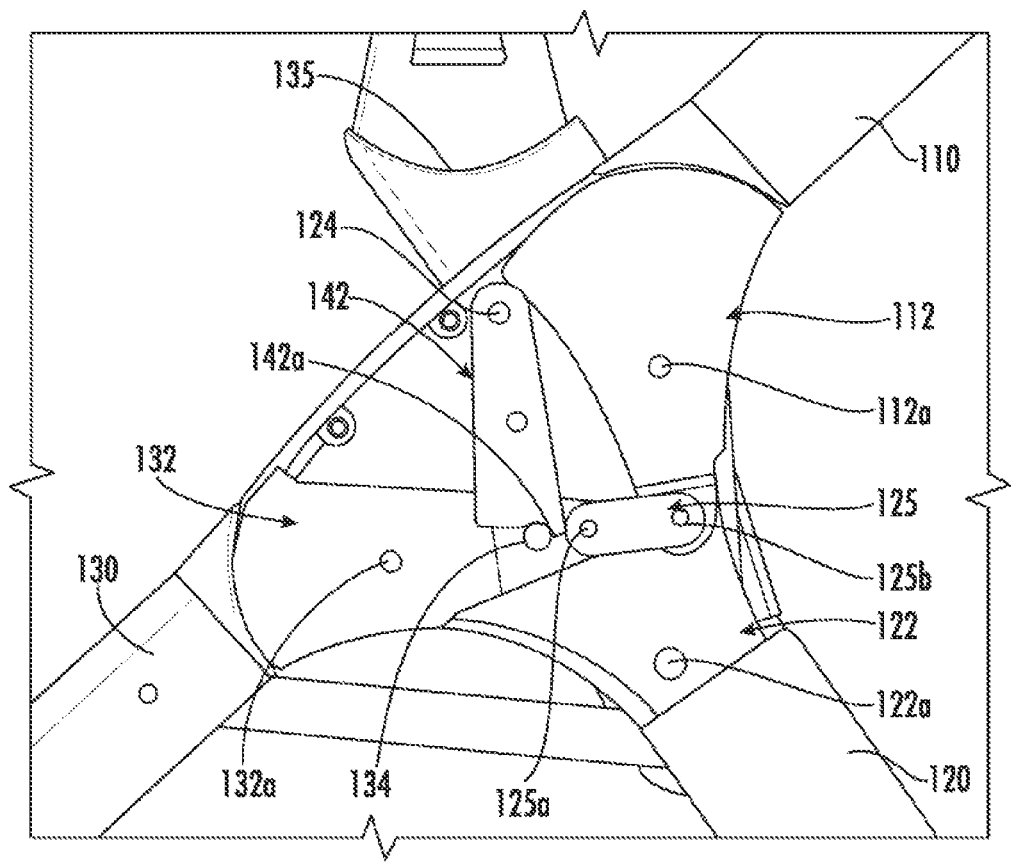
FIG. 11A is a side view of a central frame hub of the stroller according to one aspect.
Figure 11B:
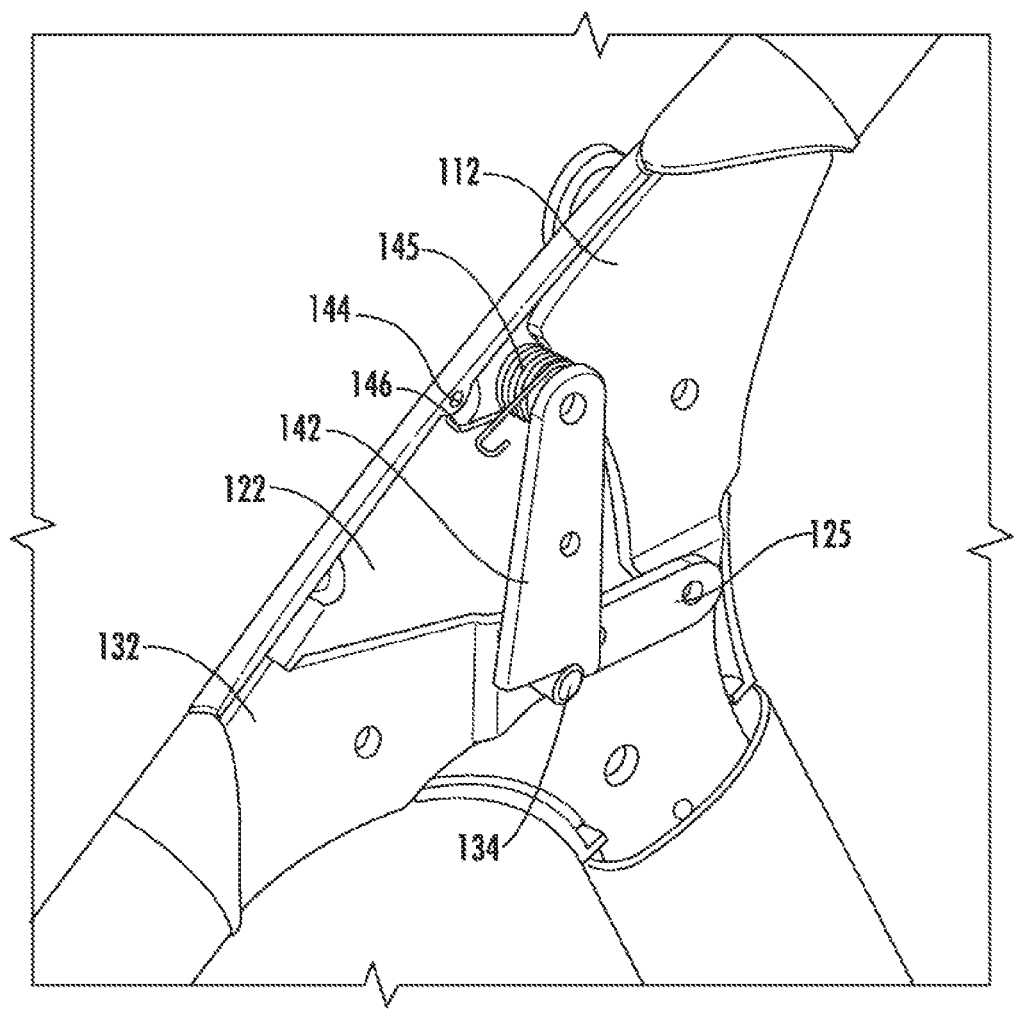
FIG. 11B is a perspective view of the central frame hub of the stroller from FIG. 11A.

FIGS. 11A and 11B illustrate details of the central frame hub 140. Generally, a series of plates are provided that are attached to at least one of the handle portion 110, the rear leg portion 120, or the front leg portion 130. Specifically, a handle plate 112 is attached to the handle portion 110, a rear leg plate 122 is attached to the rear leg portion 120, and a front leg plate 132 is attached to the front leg portion 130. As shown in FIG. 11A, a pin 112a can be provided to secure the handle plate 112 to the handle portion 110, a pin 122a can be provided to secure the rear leg plate 122 to the rear leg portion 120, and a pin 132a can be provided to secure the front leg plate 132 to the front leg portion 130. Other types of fastening means can be used to secure the plates to the respective portions.

A frame latch 142 is connected to the rear leg plate 122. In one aspect, the frame latch 142 is pivotally attached to the rear leg plate 122 via a pin 124. A latching surface 142a of the frame latch 142 engages with a pin 134 on the front leg plate 132 to lock the stroller frame 10 in the open position. In one example, the pin 134 is formed integrally with the front leg plate 132, although it could be otherwise attached to the front leg plate 132.

When the frame latch 142 is rotated so that the latching surface 142a passes and disengages from the pin 134, the handle plate 112 is configured to rotate and pulls the front leg plate 132 into the folded position using a link 125. The link 125 can be secured at a first end via a connection 125a to the front leg plate 132 and a second end via a connection 125b to the handle plate 112.

A biasing element 145 is arranged around the pin 124, which extends between the rear leg plate 122 and the frame latch 142. An end 146 of the biasing element 145 can include a hook configured to engage within an opening 144 on the central frame hub 140 and an opening of the rear leg plate 122. The biasing element 145, which can comprise a spring, is configured to bias the frame latch 142 towards a locking position (i.e. clockwise direction in FIG. 11B), in one aspect.

Figure 12:
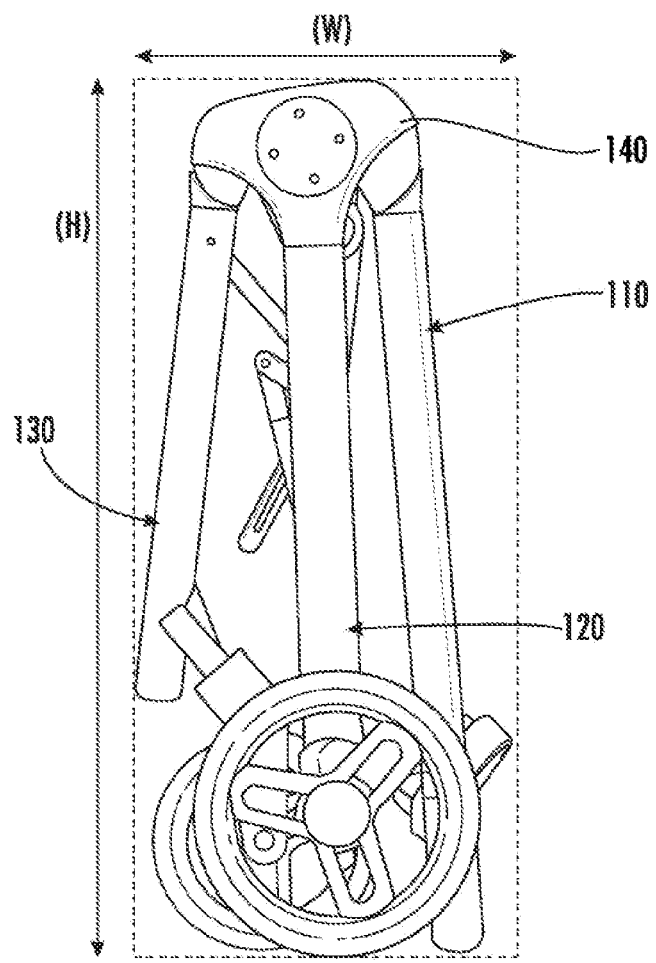
FIG. 12 is a side view of the stroller in a folded state.

The handle portion 110, the rear leg portion 120, and the front leg portion 130 are configured to be folded in a generally parallel configuration relative to each other, as shown in FIG. 12. As shown in FIG. 12, an overall width (W) of the folded stroller frame 10 is 9.0 inches-12.0 inches. In one aspect, the overall width (W) is 10.0-11.5 inches. In a preferred aspect, the overall width (W) is 10.75 inches. In one aspect, an overall height (H) of the folded stroller frame 10 is 25.0 inches-30.0 inches. In another aspect, the overall height (H) of the folded stroller frame is 27.0-28.5 inches. In a preferred aspect, the overall height (H) is 27.5 inches.

Figure 13A:
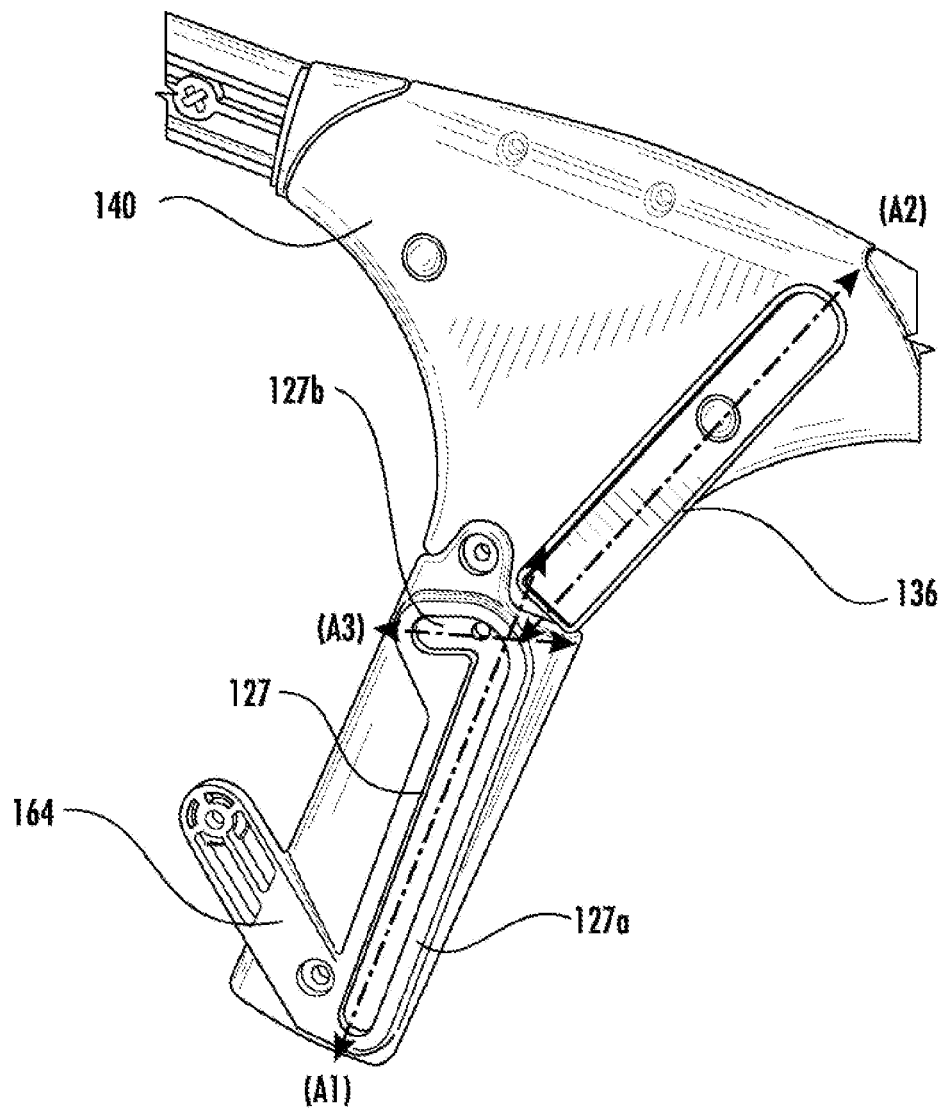
FIG. 13A is a perspective view of one aspect of the central frame hub.

Additional details regarding the central frame hub 140 are shown in FIG. 13A. In one aspect, the central frame hub 140 can include a central portion that defines an upper track 136. As also shown in FIG. 13A, a lower track 127 is provided that is defined on the rear leg portion 120. One of ordinary skill in the art would understand that the lower track 127 could be formed on a lower part of the central frame hub 140, in another aspect. The lower track 127 preferably includes a first linear track section 127a formed as a straight elongated portion and a second curved track section 127b. In one aspect, the lower track 127 has a generally "J" shaped profile. As shown in FIG. 13A, the elongated section 127a of the lower track 127 has a longitudinal axis (A1) and the upper track 136 has a longitudinal axis (A2). In one aspect, the longitudinal axis (A1) of the elongated section 127a of the lower track 127 is not parallel to the longitudinal axis (A2) of the upper track 136, In one aspect, the longitudinal axis (A2) of the upper track 136 is offset by at least 5 degrees to 40 degrees relative to the longitudinal axis (A1) of the elongated section 127a of the lower track 127. In another aspect, the longitudinal axis (A2) of the upper track 136 is offset by 15 degrees to 25 degrees relative to the longitudinal axis (A1) of the elongated section 127a of the lower track 127. In one aspect, the curved track section 127b has a longitudinal axis (A3) that is angled relative to the longitudinal axis (A1) of the elongated section 127a of the lower track 127. The longitudinal axis (A3) can be angled by 45 degrees-85 degrees relative to the longitudinal axis (A1). In one aspect, the longitudinal axis (A3) is angled by 55 degrees-75 degrees relative to the longitudinal axis (A1).

Figure 13B:
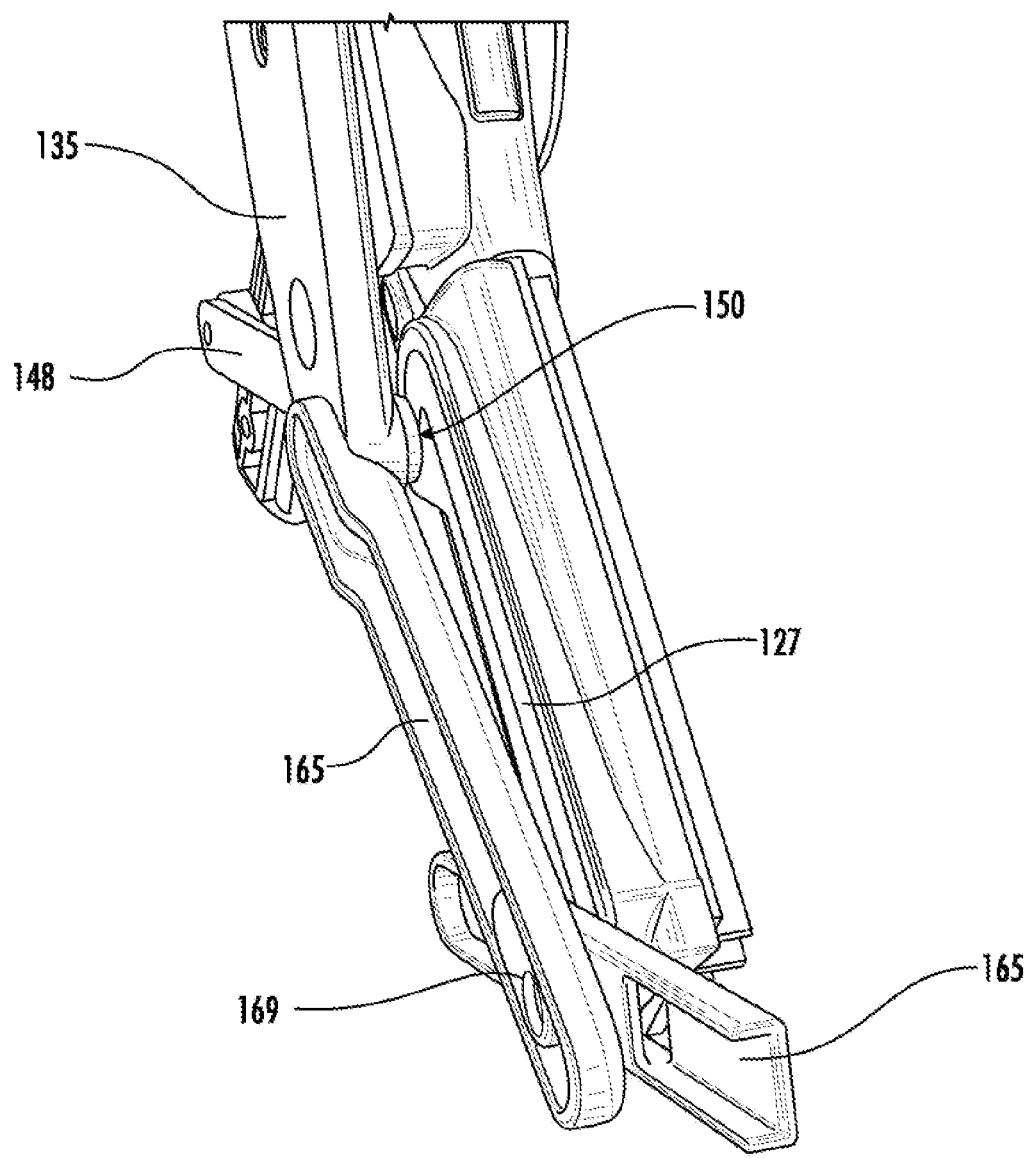
FIG. 13B is a perspective view of an interface between a seat mount and a basket guide link.

FIG. 13B illustrates additional details regarding the interface or connection provided by the lower track 127. A linkage connector 150 is provided that connects or links a lower portion 135b of the seat mount 135 with a seat mount guide link 148 and optionally with a basket guide link 165, which are described in more detail herein. The linkage connector 150 can include a pin 151 that extends through the lower portion 135b of the seat mount 135, a second end 148b of the seat mount guide link 148, and a first end 165a of the basket guide link 165.

During folding of the stroller frame 10, rotation of the front leg portion 130 is guided relative to the rear leg portion 120 via the seat mount guide link 148, which is pivotally mounted to the front leg portion 130 at a first end 148a and connected to the lower portion 135b of the seat mount 135 at the second end 148b. The seat mount guide link 148 is comprised of a single rigid link that extends from the front leg portion 130 to the rear leg portion 120, in one aspect. The second end 148b of the seat mount guide link 148 is connected the rear leg portion 120 by the lower track 127.

In the use state, at least a portion of the linkage connector 150, which is connected to the lower portion 135b of the seat mount 135, the second end 148b of the seat mount guide link 148, and the first end 165a of the basket guide link 165, rests in or engages with a terminal end of the curved track section 127b. In one aspect, the linkage connector 150 includes a track follower component that is guided along or follows the lower track 127. The lower track 127 can be configured as an internal track having a recess defined therein that is dimensioned to receive a portion of the linkage connector 150. For example, the linkage connector 150 may include a protrusion that is configured to be received within a recess of the lower track 127. One of ordinary skill in the art would recognize that another configuration may be used in which the linkage connector 150 defines a recess configured to receive a protrusion formed by the lower track 127. In this arrangement, the lower track 127 may be an external track, i.e. a T-track, and the recess defined by the linkage connector 150 rides along the external track defined by the lower track 127. Various alternative configurations for providing a connection between the linkage connector 150 and the lower track 127 can be used, as one of ordinary skill in the art would recognize based on the present disclosure. In one embodiment, the linkage connector 150 is formed separately from a pin or other connection element that couples the seat mount guide link 148, the seat mount 135, and the basket guide link. 165 with each other.

During unfolding of the stroller frame, the linkage connector 150 is first driven upward and away from the terminal end of the curved track section 127b, and then linearly downward along the elongated section 127a of the lower track 127. The curvature of the curved section 127b in the downward direction (i.e. towards a ground or support surface) ensures that the second end 148b of the seat mount guide link 148 rests in a stationary position as the stroller is unfolded and moved to the use condition thereby maintaining the front leg portion 130 and the rear leg portion 120 in the appropriate orientation relative to each other. In addition to controlling the rotation and movement of the seat mount 135 during folding and unfolding, the lower track 127 also provides vertical support for the seat mount 135 when in the use state due to the downward curvature of the curved section 127b.

Figure 14B:
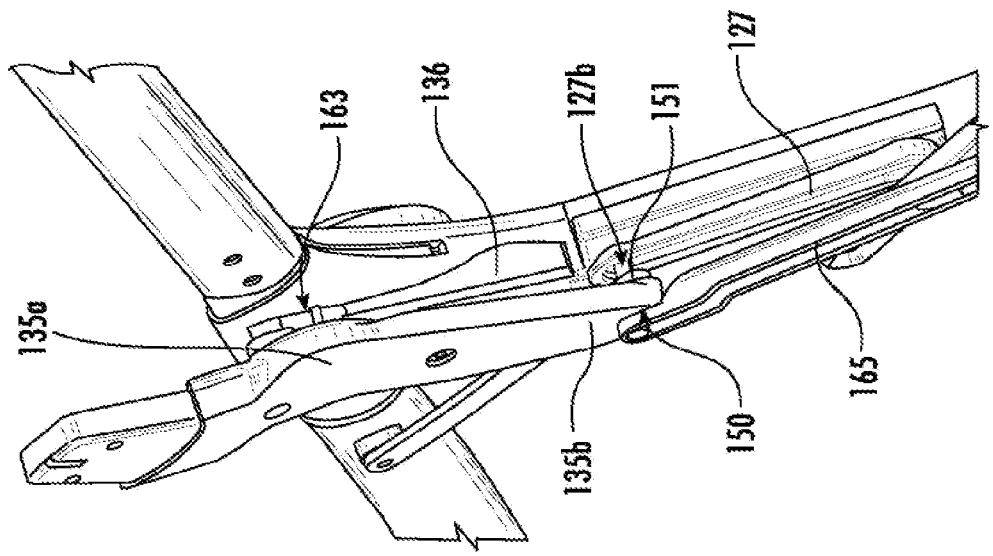
FIGS. 14A and 14B are perspective views of additional aspects of the central frame hub and the seat mount.
Figure 15B:
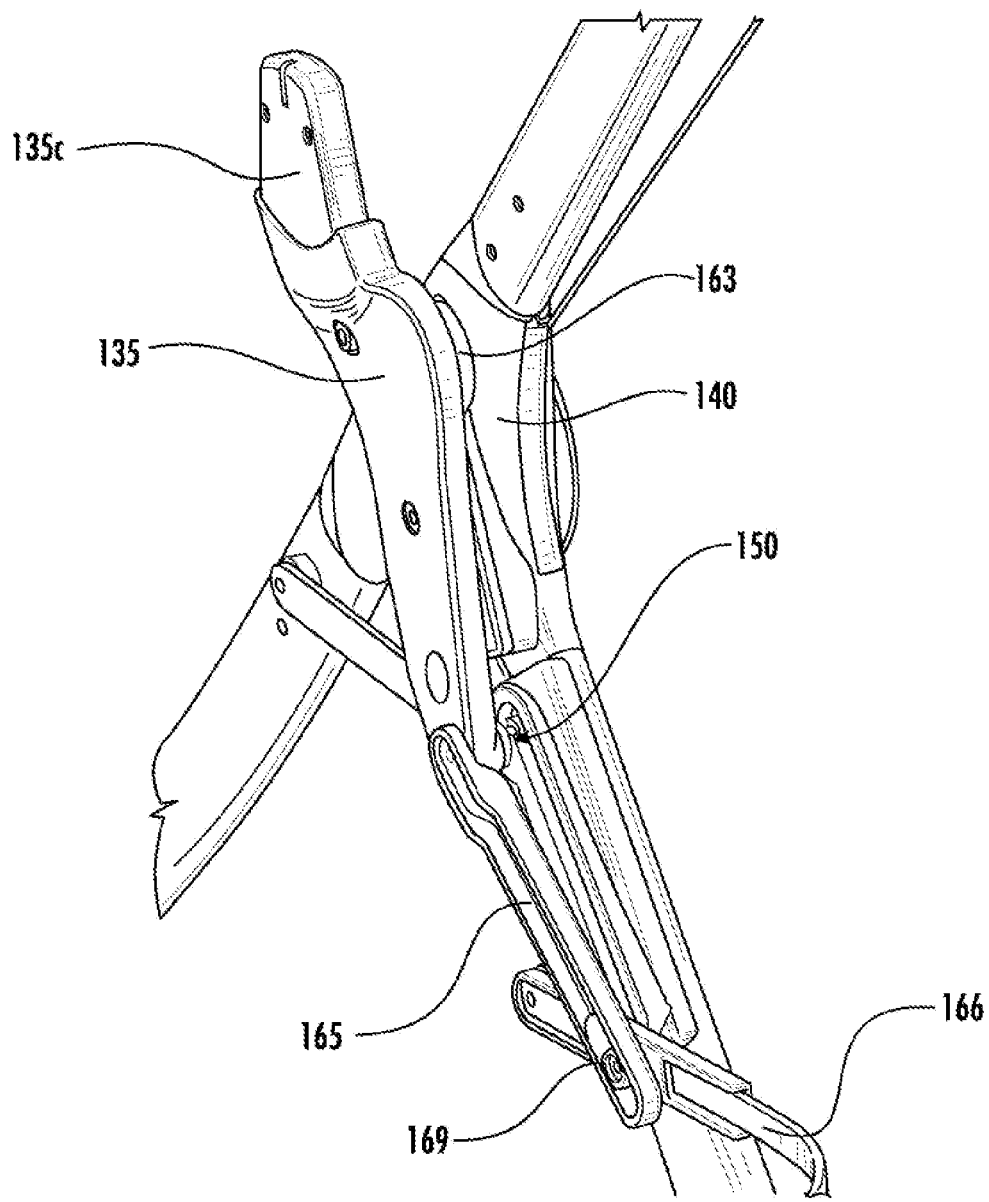
FIG. 15B is an additional perspective view of the seat mount, the central frame hub, and the basket assembly.
Figure 15C:
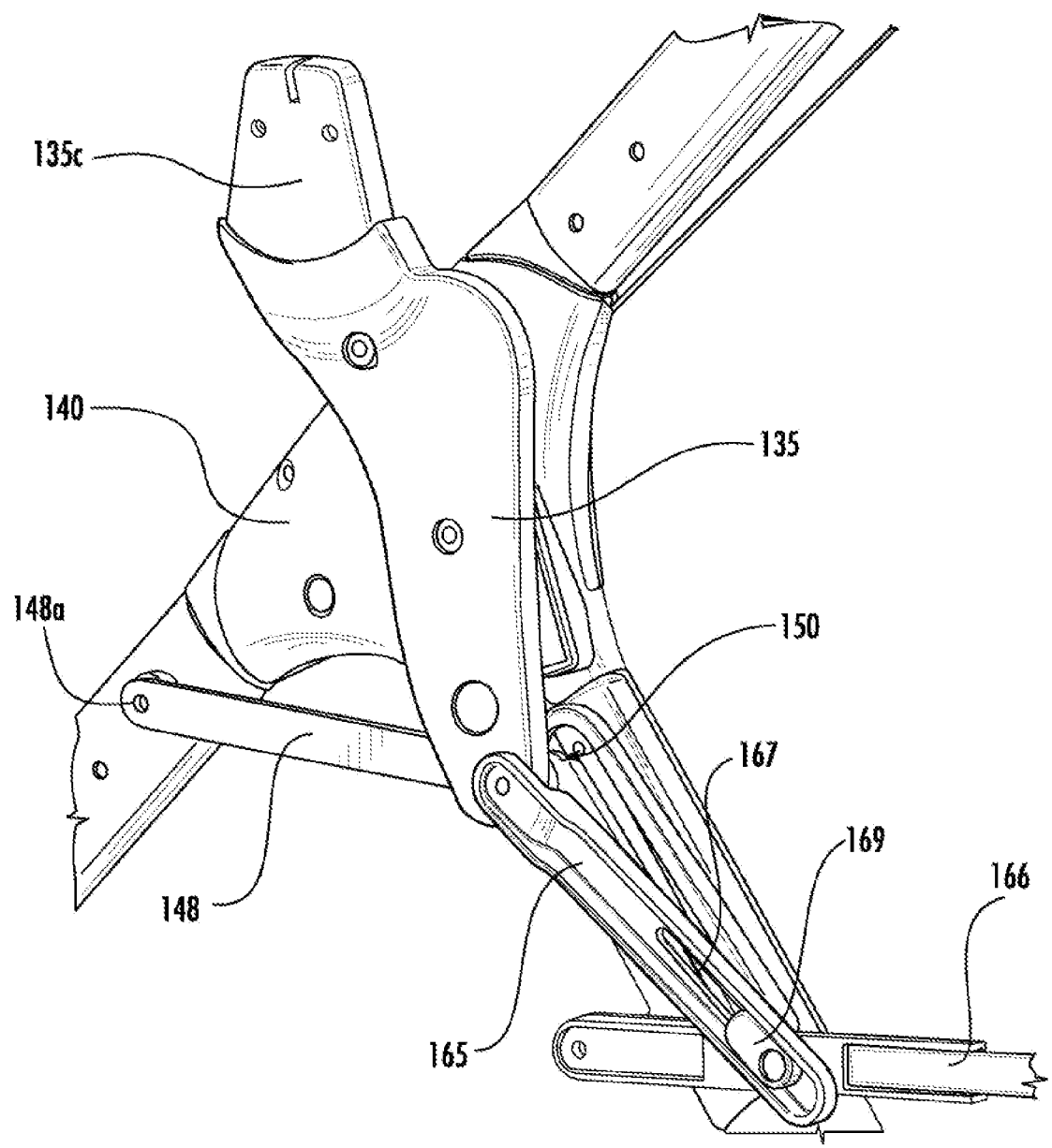
FIG. 15C is an additional perspective view of the seat mount, the central frame hub, and the basket assembly.

A first portion or medial portion 135a of the seat mount 135 is connected to the upper track 136 by a pivoting guide 163, as shown in FIGS. 14B and 15B. In one example, the pivoting guide 163 includes a protrusion configured to engage within the upper track 136. The upper track 136 can be formed with a slotted profile, and the protrusion on the pivoting guide 163 can include an enlarged head that slides within the upper track 136. The pivoting guide 163 thereby provides both rotational support for the seat mount 135 as well as linearly guiding support along the upper track 136. One of ordinary skill in the art would understand that an alternative configuration could be provided in which the upper track 136 is an external track and defines a protrusion, while the pivoting guide 163 defines a recess dimensioned to receive the external track of the upper track 136. Various configurations and engagement profiles can be used to join or otherwise connect pivoting guide 163 relative to the upper track 136.

As shown in FIGS. 16A-16C and 17A-17E, during folding of the stroller frame 10, the upper track 136 and lower track. 127 work in unison such that a longitudinal axis of the bayonet 135c remains generally upright or vertical during the folding operation if the stroller frame 10 is folded from the upright position. One of ordinary skill in the art would understand that the bayonet 135c may not be in the upright position during folding if the entire stroller frame 10 is tilted or otherwise not upright during folding. In one aspect, the longitudinal axis of the bayonet 135e extends within a gap or space defined between the handle portion 110 and the front leg portion 130 throughout the folding operation. In one aspect, the longitudinal axis of the bayonet 135c does not pivot or rotate more than 45 degrees during folding of the stroller frame 10. The longitudinal axis of the bayonet 135c can be configured to not pivot or rotate more than 25 degrees during folding of the stroller frame 10. In one aspect, during folding of the stroller frame 10, the bayonet 135c is primarily driven in a single direction (i.e. from an extended state to a retracted state), while minor or incidental tilting or pivoting may occur.

Figure 18A:
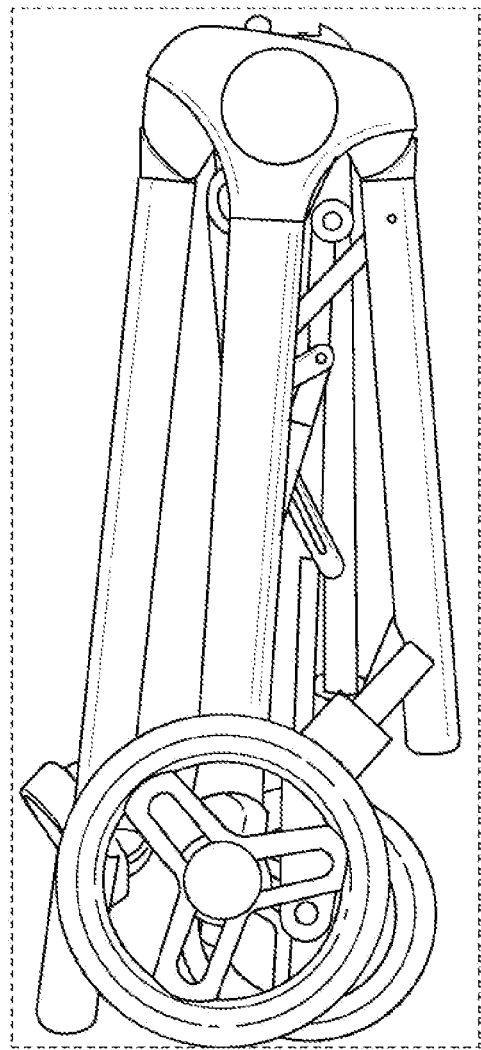
FIG. 18A is a side view of the stroller assembly in the fully folded state.
Figure 18B:
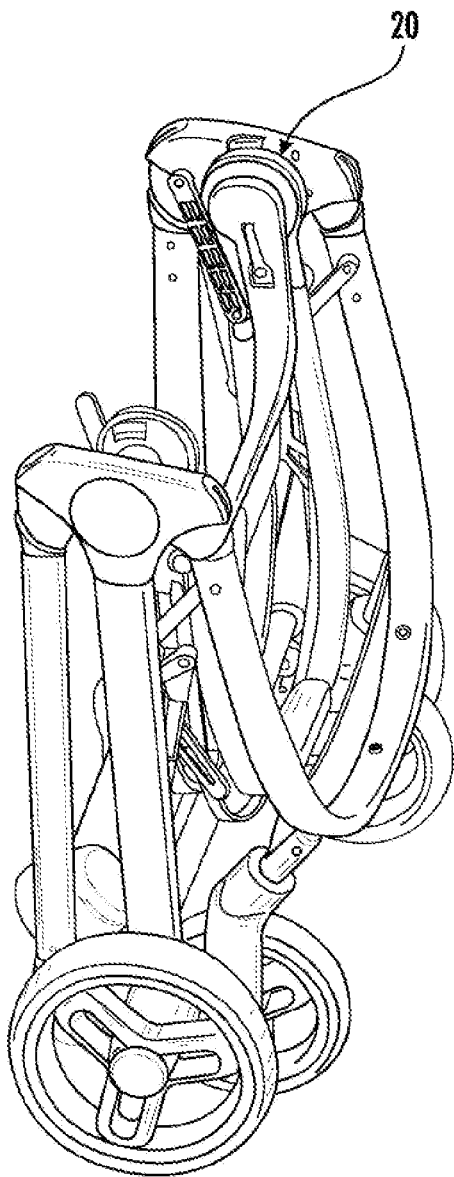
FIG. 18B is a perspective view of the stroller assembly in the fully folded state.

Based on the folding configuration, the folded child seat frame 20 remains within a folded boundary of the stroller frame 10 to minimize the folded size of the stroller frame assembly. This is also shown in FIGS. 18A and 18B. The child seat frame 20 is configured to fold within the stroller frame 10 (i.e. between the handle portion 110 and front leg portion 130), as illustrated in FIGS. 18A and 18B, This configuration results in a more compact shape as compared to other stroller assemblies in which the child seat frame is arranged outside of the stroller frame 10. The bayonet 135c, which is retractable, also supports the ability of the child seat frame 20 to be pulled within a folded perimeter, outline or envelope of the stroller frame 10.

The lower portion 135b of the seat mount 135 is pivotally connected to the first end 165a of the basket guide link 165. An opposite, second end 165b of the basket guide link 165 is connected to a basket frame 166. A basket assembly can be comprised of the basket guide link 165, the basket frame 166, and a basket frame link 164, in one aspect.

Figure 14A:
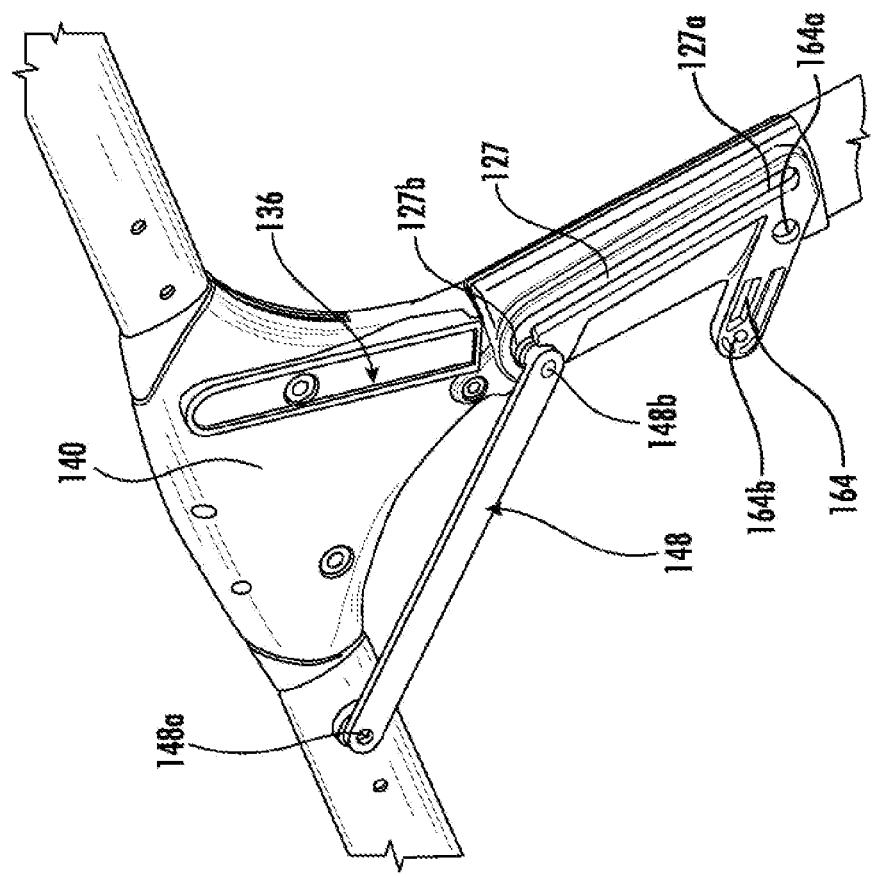
Figure 16C:
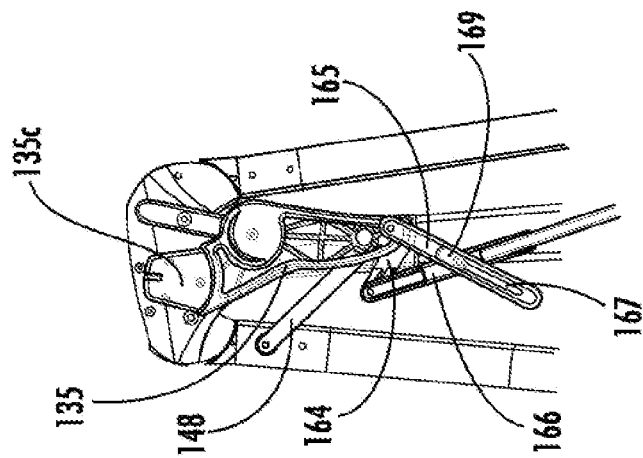
FIGS. 16A-16C are side views of the central frame hub of the stroller in the upright state, semi-folded state, and completely folded state, respectively.
Figure 16B:
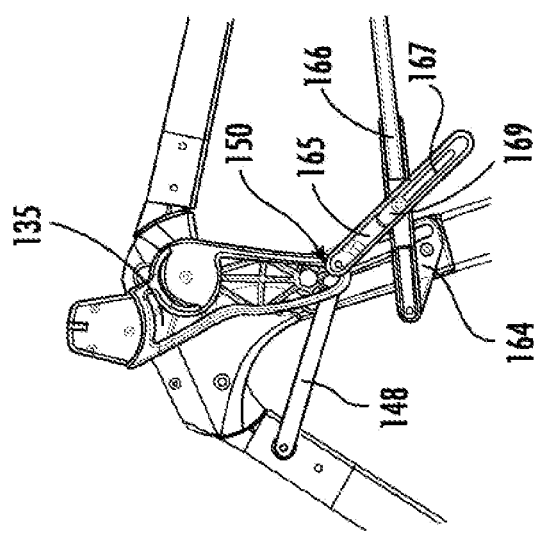

In one aspect, the connection of the second end 165b of the basket guide link 165 to the basket frame 166 includes a sliding connection. The sliding connection can include a guide slot 167 formed on the basket guide link. 165 and a guide 169 attached to the basket frame 166. The basket frame link 164 extends from the rear leg portion 120 and towards the front leg portion 130, as shown in FIGS. 14A, 16B, and 16C. The basket frame link 164 is attached at a first end 164a to the rear leg portion 120 and is arranged adjacent to the lower track 127. The basket frame link 164 can be fixed to a portion of the lower track 127. In one aspect, the basket frame link 164 is fixed in position at an acute angle relative to the lower track 127. A second end 164b of the basket frame link 164 is attached to a first end 166a of the basket frame 166. In one aspect, the basket frame link 164 provides a pivoting connection between the rear leg portion 120 and the basket frame 166.

Figure 16A:
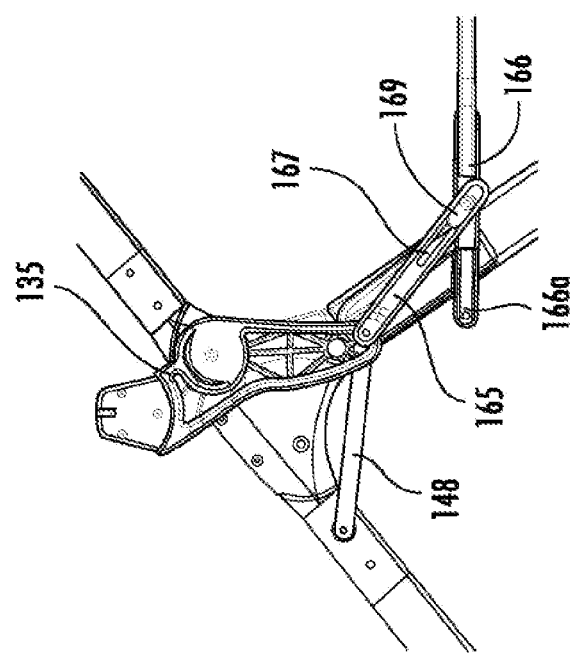

FIGS. 16A-16C illustrate one aspect of the folding of the stroller frame, and FIGS. 17A-17E illustrate additional aspects of the folding of the stroller frame. Folding of the stroller assembly can generally be initiated by a release mechanism or folding mechanism, such as the arrangement disclosed in FIGS. 11A and 11B. Once a latch or other mechanism is disengaged, the handle portion 110 can begin folding downward and the front leg portion 130 is allowed to rotate towards the rear leg portion 120.

Figure 17A:
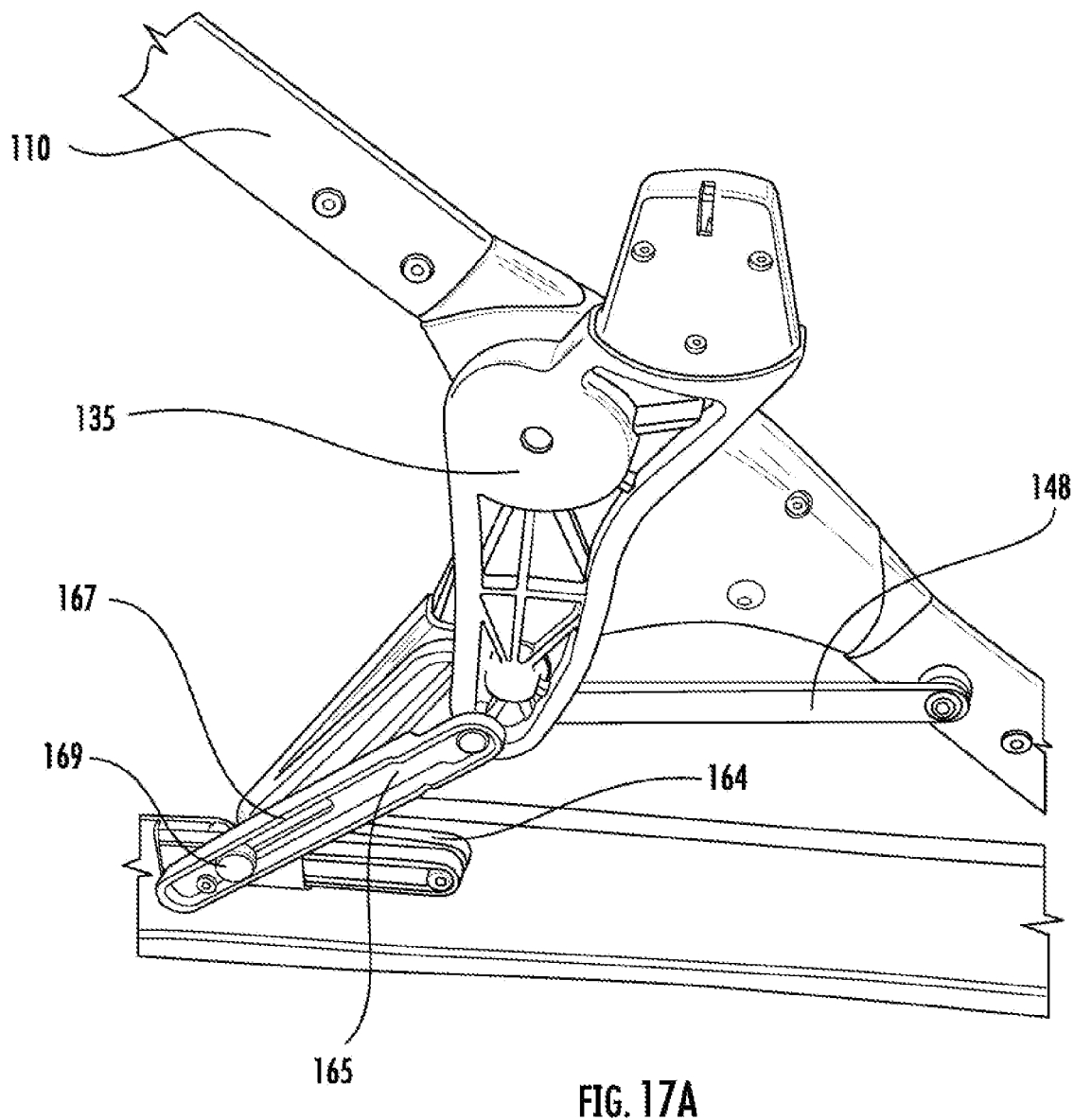
FIGS. 17A-17B are perspective views of the central frame hub of the stroller in a series of states ranging from upright to folded.

During folding of the frame, the guide slot 167 in the basket guide link 165 allows the basket frame 166 to rotate downward to collapse the basket frame 166 within the folded frame boundary between the front leg portion 130 and the handle portion 110. As shown in FIGS. 16A-16C and FIGS. 17A-17E, the basket frame link 164, the basket guide link 165, the basket frame 166 cooperate with each other to control the folding and unfolding of the basket assembly. In the unfolded state, the basket frame link 164 can be parallel with the basket frame 166, as shown in FIG. 17A. In the folded state, as shown in FIGS. 17E and 18C, the basket guide link 165, the basket frame 166, and the basket frame link 164 are each angled relative to each other. In one aspect, the basket guide link 165, the basket frame 166, and the basket frame link 164 form a triangle in the folded state.

Figure 17B:
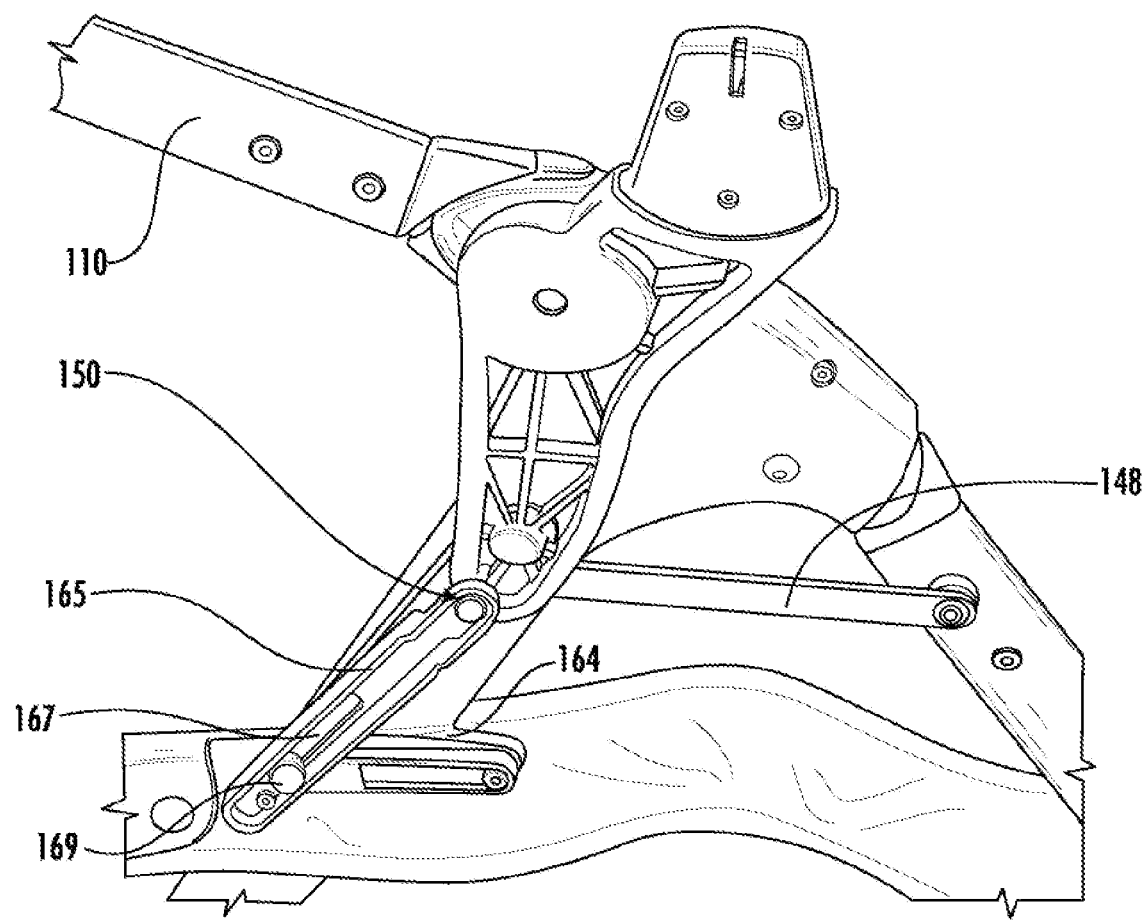
Figure 18C:
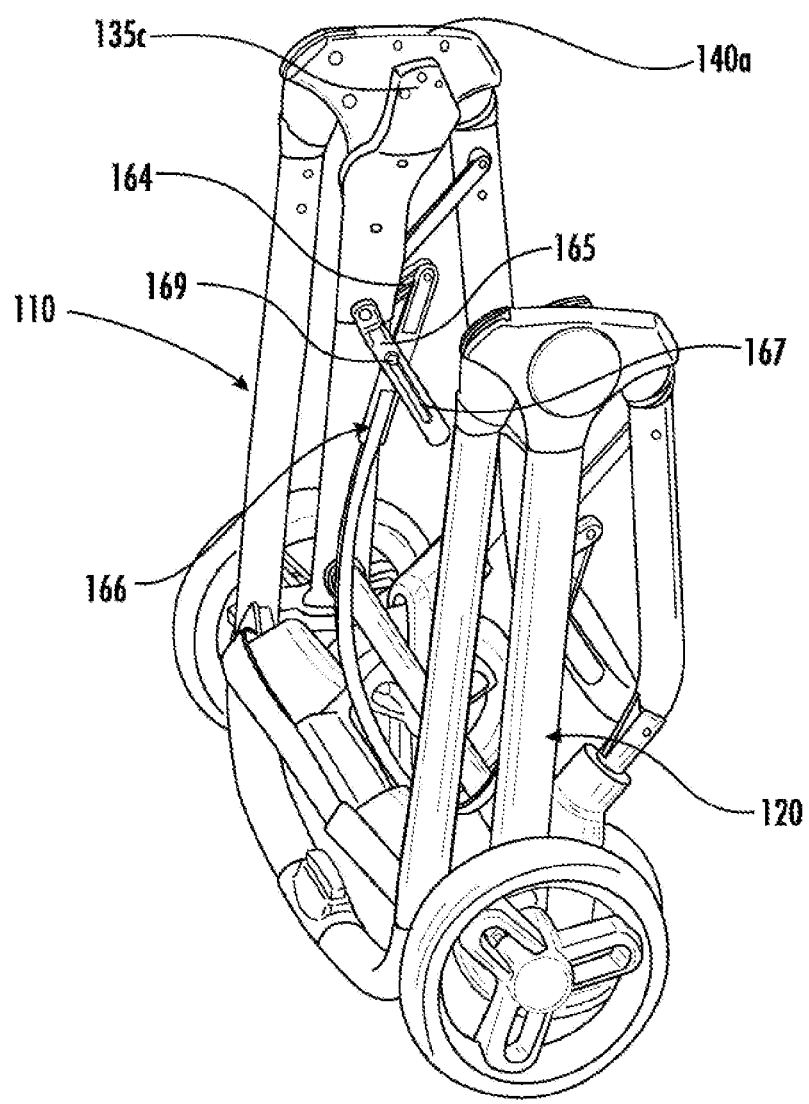
FIG. 18C is another perspective view of the stroller assembly in the fully folded state.
Figure 19D:
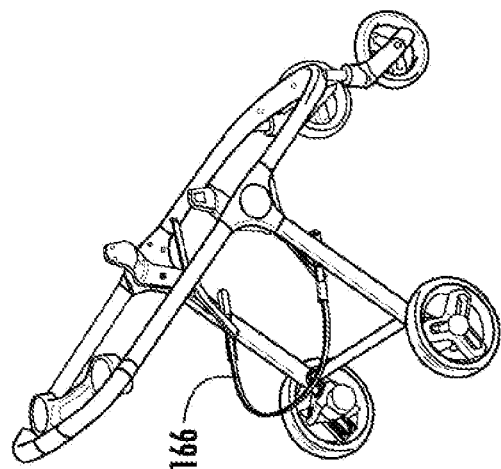
FIGS. 19A-19D are perspective views of the stroller assembly ranging from the folded state to the upright state.
Figure 19C:
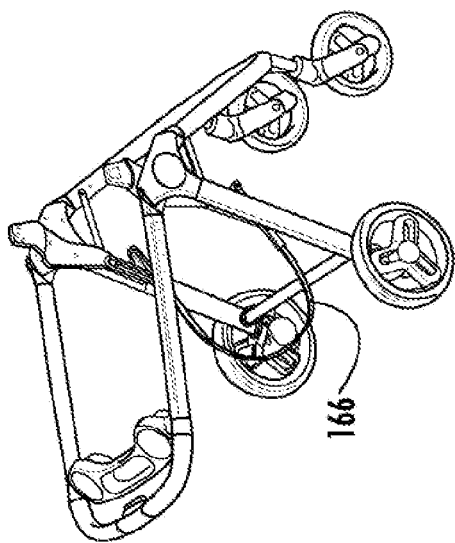
Figure 19B:
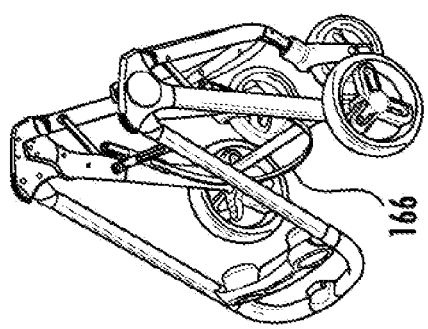
Figure 19A:
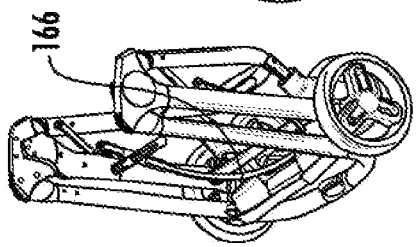
Figure 20:
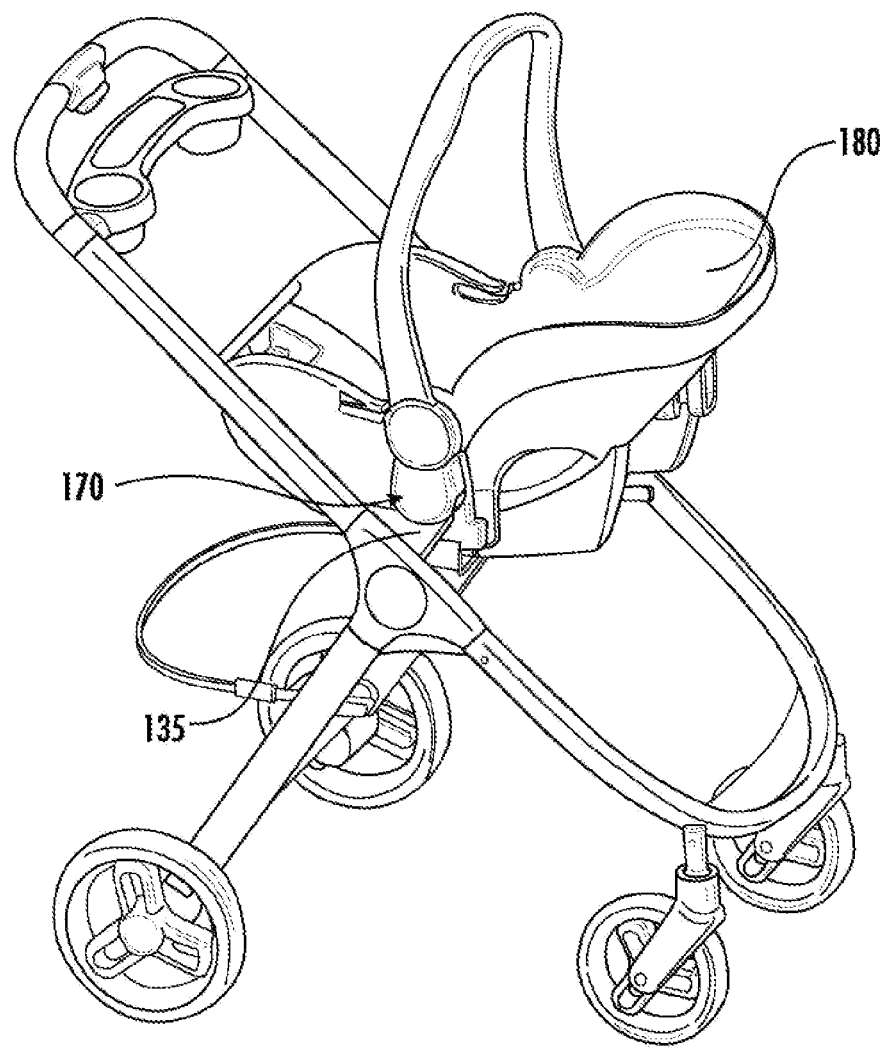
FIG. 20 is a perspective view of the stroller assembly including an adaptor assembly for a carrier.

As the frame is beginning to be folded (i.e. the handle portion 110 is folded downward towards the rear leg portion 120), which is illustrated in FIGS. 17A and 17B, the linkage connector 150 is initially driven upwards along the lower track 127 away from a terminal end of the curved track section 127b and out of the curved track section 127b. Next, the linkage connector 150 begins traveling downward along the elongated section 127a.

Figure 17C:
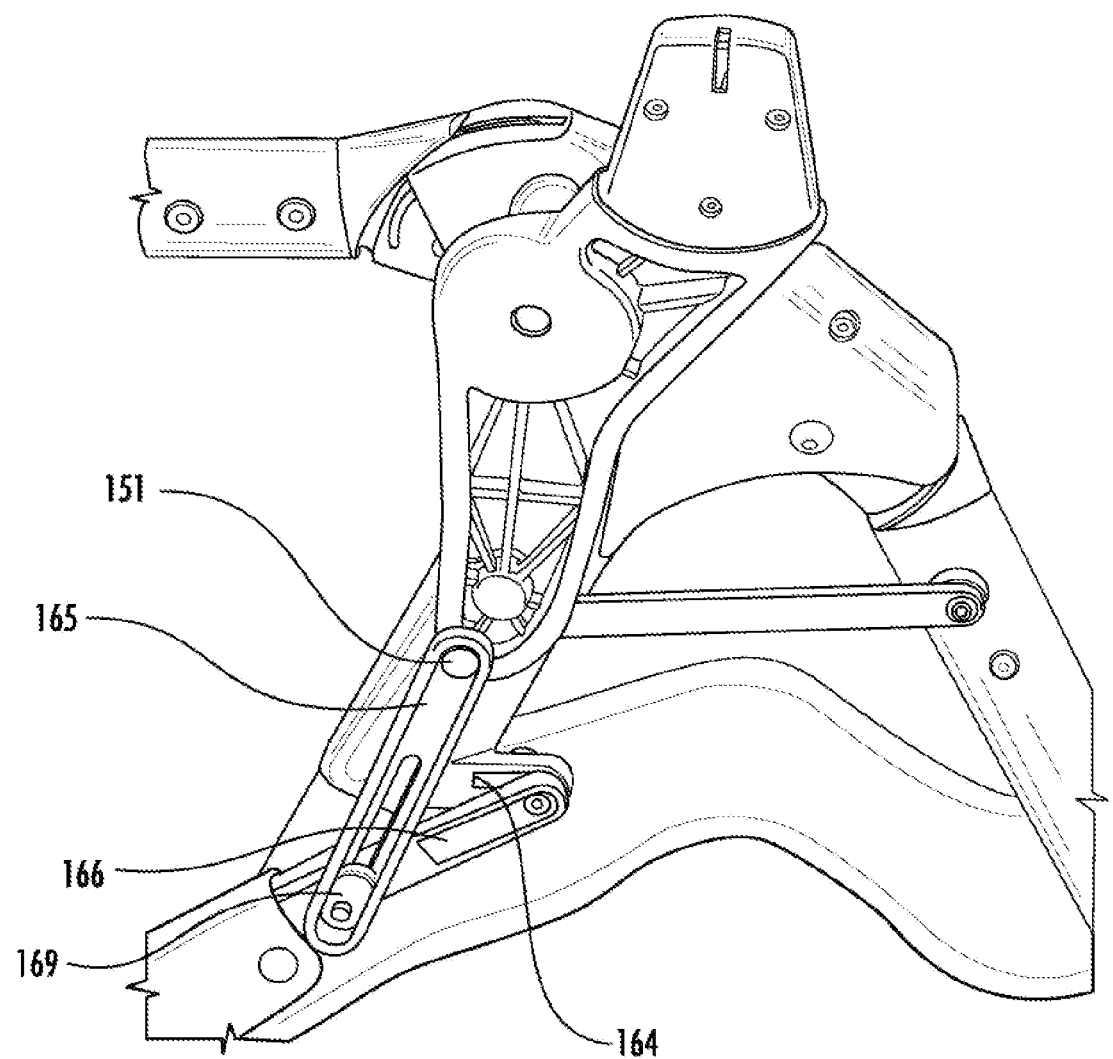
Figure 17D:
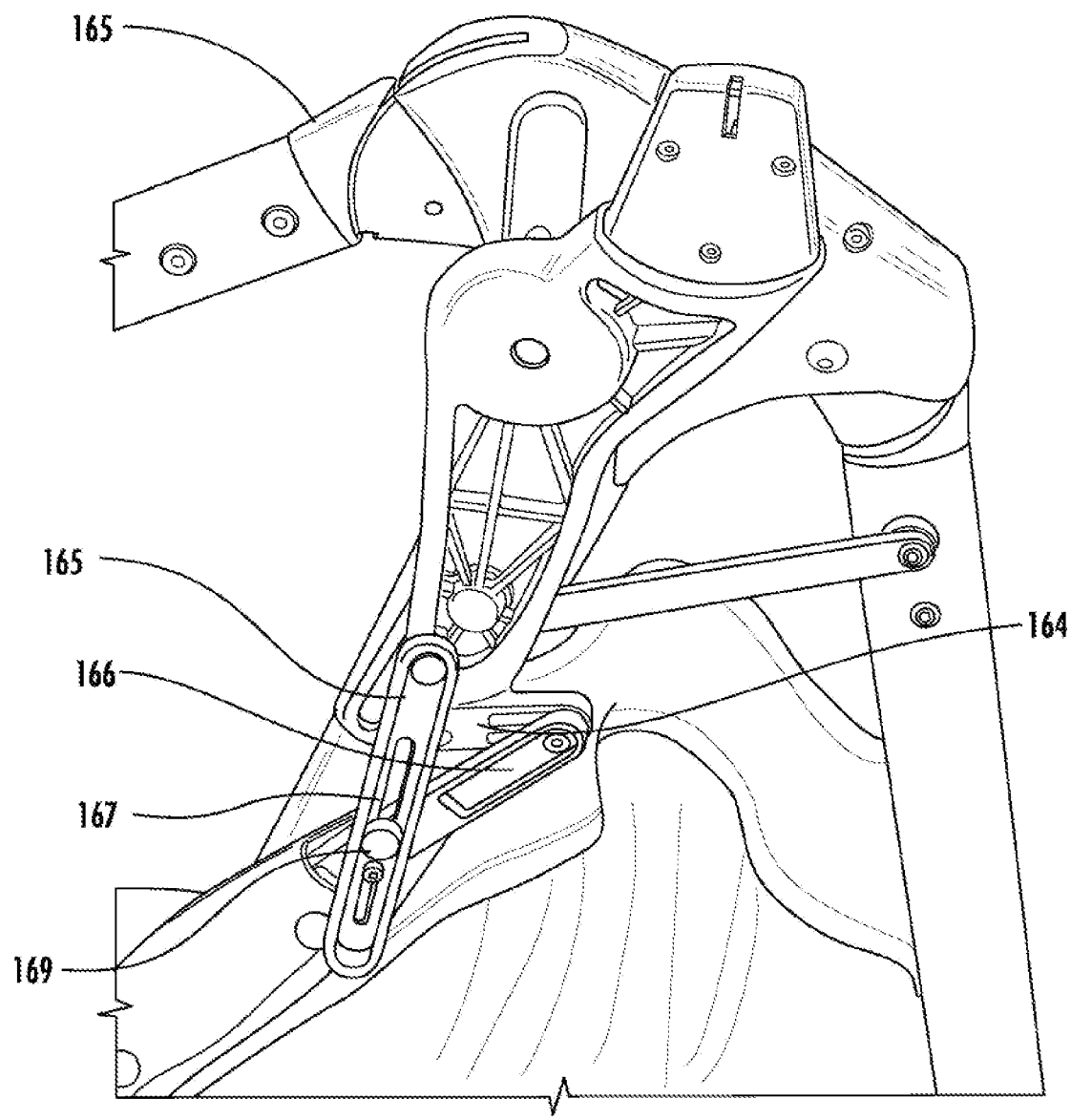
Figure 17E:
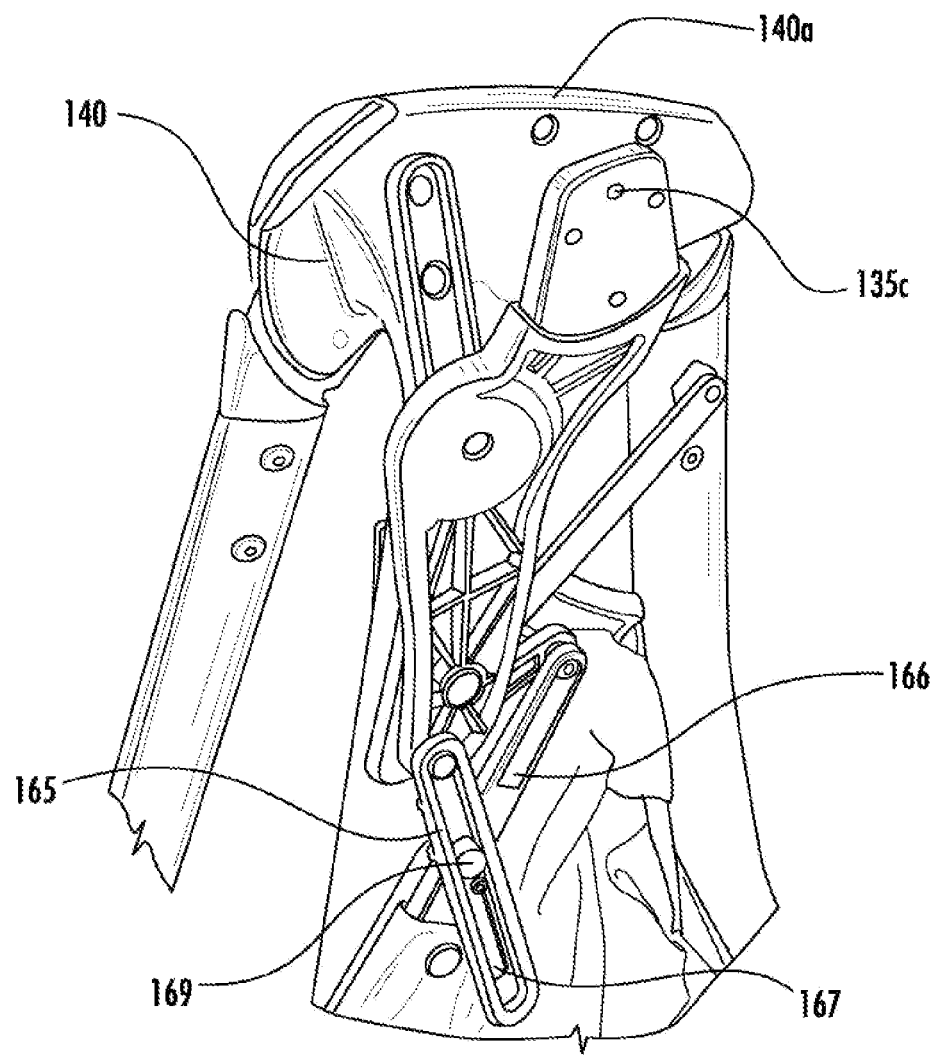

As the front leg portion 130 and the rear leg portion 120 are driven towards each other during folding, the front leg portion 130 drives the seat mount guide link 148 up and out of the curved track section 127b of the lower track 127. In one aspect, the link 125 inside of the central frame hub 140 (as shown in FIG. 11A) guides the front leg portion 130 towards the rear leg portion 120 during folding. Other aspects of the connections shown in FIG. 11A can also be used to control the folding operation. As the linkage connector 150 continues to be driven down the lower track 127 and the handle portion 110 continues folding downward, the basket frame 166 is folded downward, as shown in FIG. 17C. As the folding motion continues as shown in FIG. 17D, the guide 169 travels within the guide slot 167 as the basket frame 166 is driven further downward and folds with the rear leg portion 120 towards the front leg portion 130. Finally, the stroller is folded, as shown in FIG. 17E, which shows the basket guide link 165 and the basket frame 166 intersecting each other in an essentially cross or "X" arrangement. As shown in FIG. 17E, the guide 169 has traveled to an opposing end of the guide slot 167 as compared to when the stroller was in the upright or an unfolded position.

When opening the stroller frame 10 from a folded position to an unfolded position, the rear leg portion 120 and the front leg portion 130 are driven apart from another for a predetermined distance prior to the basket frame 166 being driven to its upright position. The delay in the basket frame 166 being driven upward during unfolding of the stroller frame 10 is due to the orientation and connections provided by the basket frame link 164, the guide slot 167, and the guide 169. Upon unfolding of the frame, the basket guide link 165 pivots the basket frame 166 to a relatively horizontal raised position, which maximizes the storage capacity of a basket, as illustrated in FIGS. 19A-19D.

As shown in FIG. 17E, the seat mount 135 is positioned inside of an outline or envelope of the central frame hub 140 in the folded state, in one aspect. The linkage connector 150 causes the bayonet 135c to move between an extended position, which corresponds to the unfolded state or upright position of the stroller frame 10, and a retracted position, which corresponds to the folded state of the stroller frame 10. In one example, the bayonet 135D is configured to extend out further from the central frame hub 140 in the extended position as compared to the retracted position. The bayonet 135c can extend a first height (i.e. extended height), which is defined above the central frame hub 140, when the stroller frame assembly 10 is unfolded. The bayonet 135c can extend a second height (i.e. retracted height) that is less than the first height when the stroller frame assembly 10 is folded. In one aspect, the second height can correspond to a position in which at least a portion of the bayonet 135c is above the central frame hub 140. In another aspect, an entirety of the bayonet 135c is vertically positioned below an upper or top surface 140a of the central frame hub 140 in the retracted position. One of ordinary skill in the art would understand that other configurations for the bayonet 135c can be provided, and the bayonet 135c can be configured to be in various positions relative to the central frame hub 140, or any other component of the frame 10, in the extended and retracted positions.

In one aspect, a method of folding a stroller frame 10 from an upright position to a folded position is also provided. The method includes folding a handle portion 110 downwards such that the handle portion 110 drives a front leg portion 130 towards a rear leg portion 120. The method also includes driving a linkage connector 150 along a track 127 defined on the rear leg portion 120 from a curved track portion 127b to a linear track section 127a. The linkage connector 150 is commonly attached or connected to a seat mount 135 defining a bayonet 135D, a seat mount guide link 148 connected to the front leg portion 130, and a basket guide link 165. The method can include any one or more other features disclosed herein as described with respect to the stroller frame 10. The functionality of any one or more of the components described herein can be used in conjunction with the method of folding the stroller frame 10.

In another aspect, an adaptor assembly 170 is provided that is configured to engage with a child or infant carrier 180 and that can be attached to the seat mount 135, as shown in FIGS. 20, 21A, 21B, 22A, 22B.

Figure 21B:
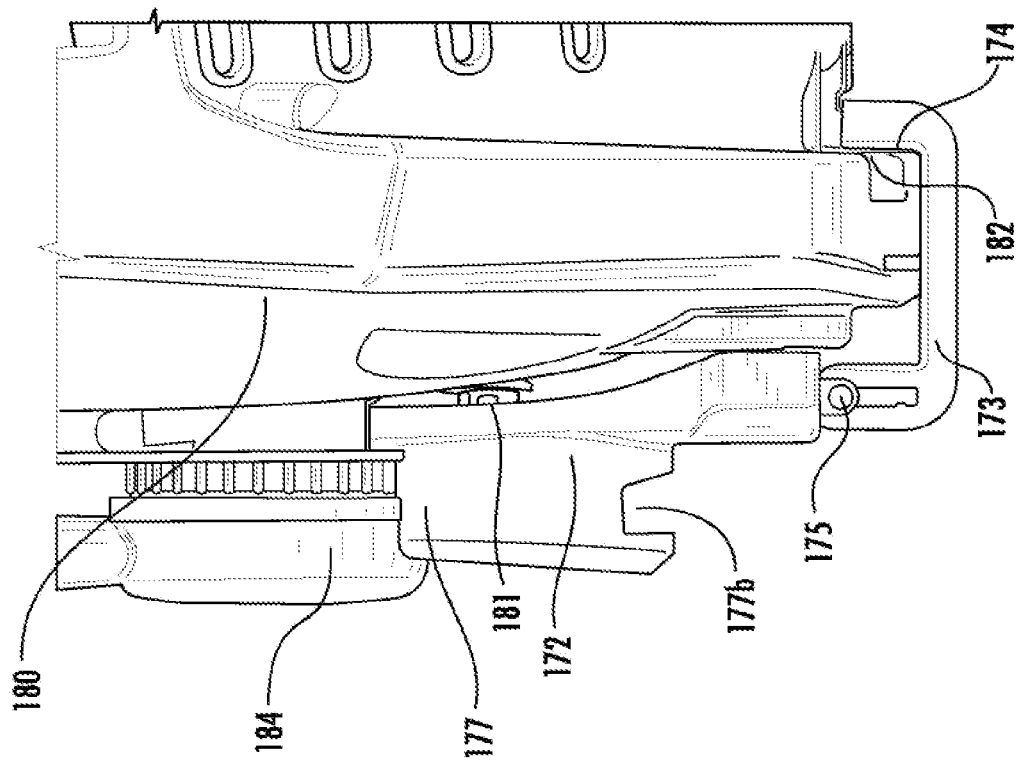
FIG. 21B is a rear view of the adaptor assembly in engagement with the carrier.
Figure 21A:
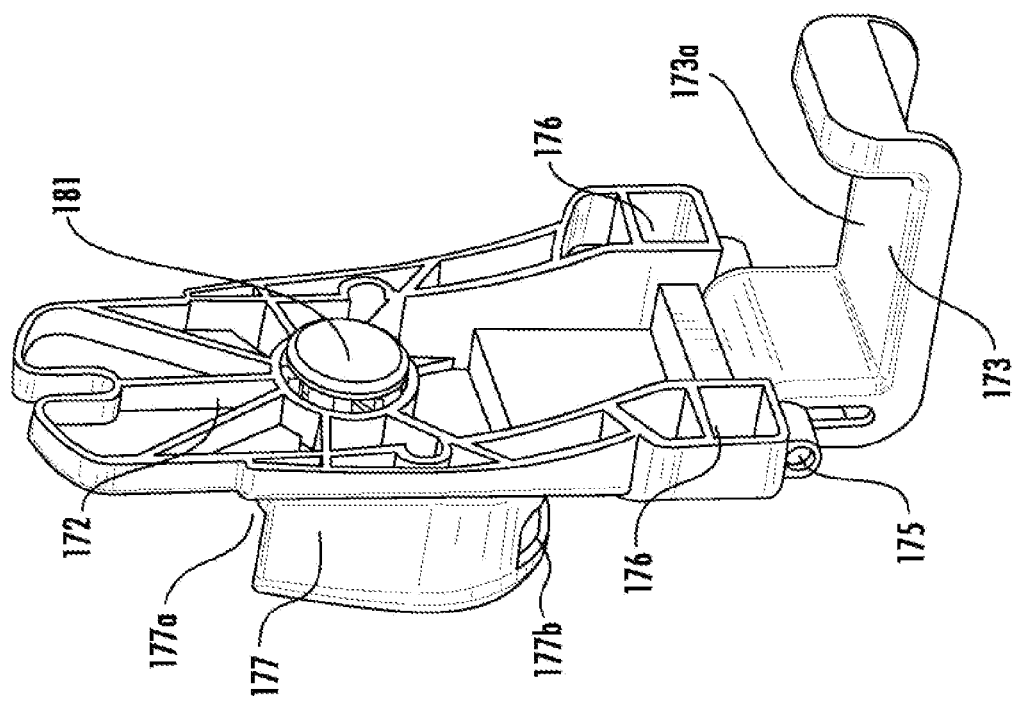
FIG. 21A is a perspective view of the adaptor assembly of FIG. 20.

In one aspect, the adaptor assembly 170 includes a vertical support body 172, a control member 173 including a bearing surface 174, and at least one latching region 176, as shown in FIGS. 21A and 21B. In one aspect, the control member 173 is a pivoting control member due to its connection with the vertical support body 172, which is provided via a pivot connection 175 between the vertical support body 172 and the control member 173. As shown in FIG. 21B, the pivot connection 175 can include a pin. In one aspect, the control member 173 has a C-shaped profile.

The vertical support body 172 is configured to support the carrier 180 in one or both of the vertical and lateral directions. The vertical support body 172 includes a base portion 177 including a first receptacle 177a on an upper side and a second receptacle 177b on a lower side. The first receptacle 177a, which is also referred to herein as a carrier receptacle, is configured to support or receive a portion 184 of the carrier 180, such as a bub of a carry handle of the carrier 180. In one aspect, the first receptacle 177a can be formed as a curved surface or a pocket.

The second receptacle 177b, which is also referred to herein as a stroller receptacle, is configured to receive a portion of the stroller frame, such as the bayonet 135c on the seat mount 135. In one aspect, the second receptacle 177b can be formed as an elongated slot with an enclosed lateral perimeter. In order to support an underside of the carrier 180 in the vertical direction, the adaptor assembly 170 can include at least one of (i) the first receptacle 177a, or (ii) a support surface 173a defined on the control member 173.

A release button 181 is provided on the adaptor assembly 170 and is configured to release the adaptor assembly 170 from the stroller frame 10. In one aspect, the release button 181 is configured to disengaged the adaptor assembly 170 from the bayonets 135c on the stroller frame 10.

The latching region 176 is configured to receive at least one plunger of the carrier 180 to secure the carrier 180 to the vertical support body 172 and prevent unintentional removal of the carrier 180 from the adaptor assembly 170. In one aspect, the latching region 176 is formed as a receptacle or pocket. One of ordinary skill in the art would understand that other arrangements can be used for the latching region 176.

The bearing surface 174 is configured to interact with a corresponding surface 182 on the carrier 180 to ensure that the latching region 176 and the carrier plunger remain engaged properly while the carrier 180 is supported on the stroller frame 10. The control member 173 and the bearing surface 174 therefore function as a locking assembly, in one aspect. The bearing surface 174 also ensures that the adaptor assembly 170 is secured, particularly in the lateral direction (i.e. left to right in FIG. 21B). After the control member 173 is lowered or deployed, a rocker rail of the carrier 180 is arranged down into the pocket or space defined between the bearing surface 174 and the vertical support body 172.

Figure 22B:
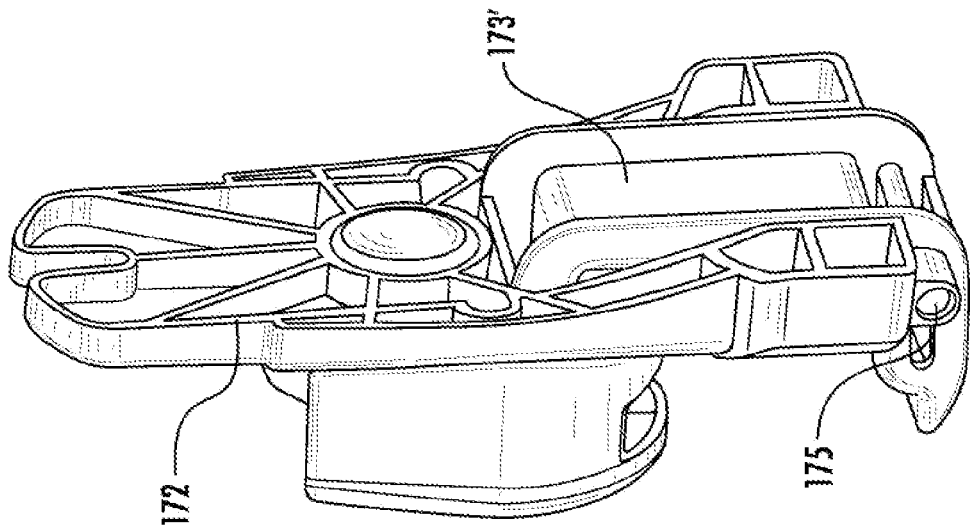
FIG. 22B is a perspective view of the adaptor assembly in a storage state.
Figure 22A:
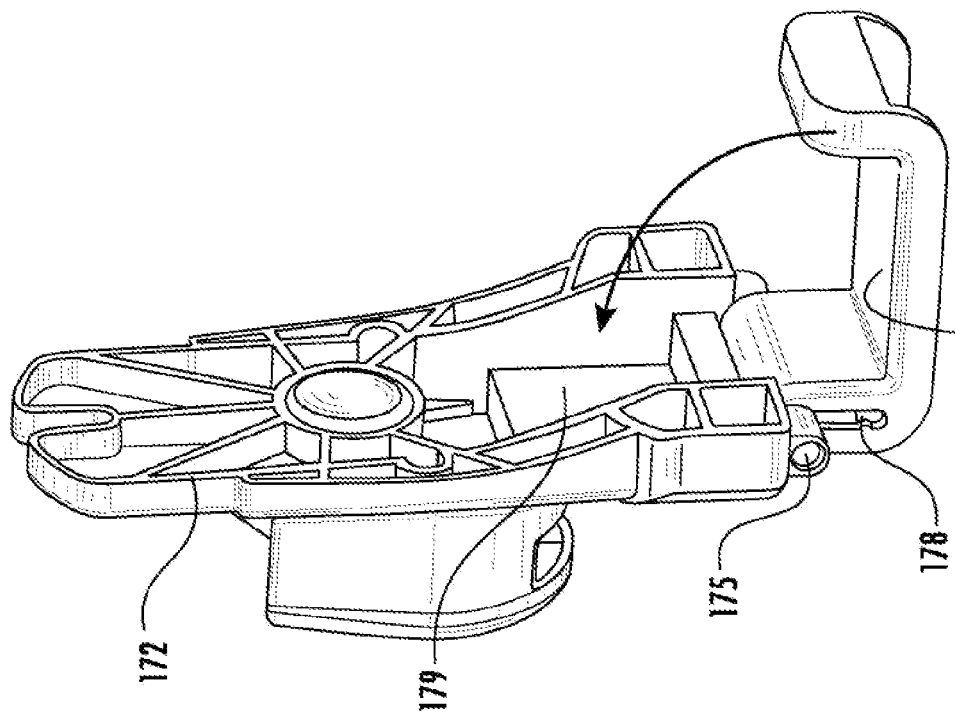
FIG. 22A is a perspective view of the adaptor assembly in an open state.

When the adaptor assembly 170 is removed from the stroller frame 10, the control member 173 is configured to be rotated inward and engage in a receptacle 179 of the vertical support body 172. This folding configuration of the control member 173' is shown in FIG. 22B, and reduces the size of the adaptor assembly 170 for easier storage with the stroller. In one aspect, the control member 173 includes an elongated slot 178 configured to receive the pivot connection 175, and the pivot connection 175 slides along the elongated slot 178 as the control member 173 is rotated from the use state (i.e. FIG. 22A) to the folded state (i.e. FIG. 22B).

Figure 23A:
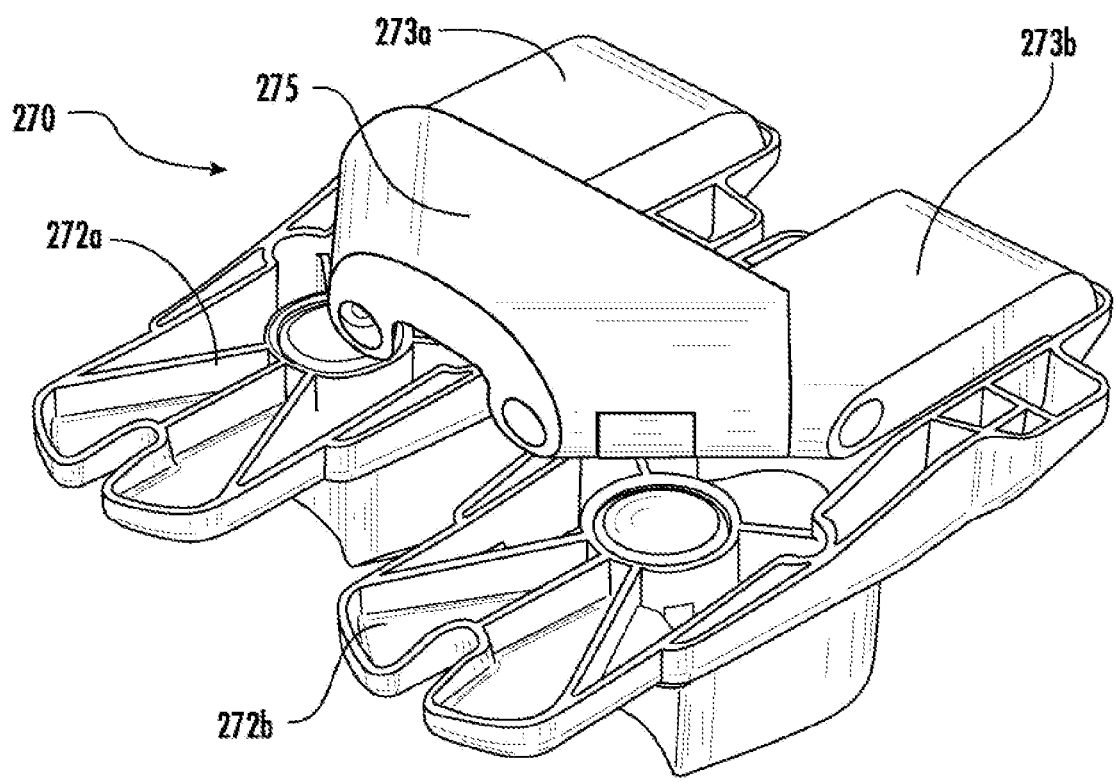
FIG. 23A is a perspective view of another adaptor assembly.
Figure 23B:
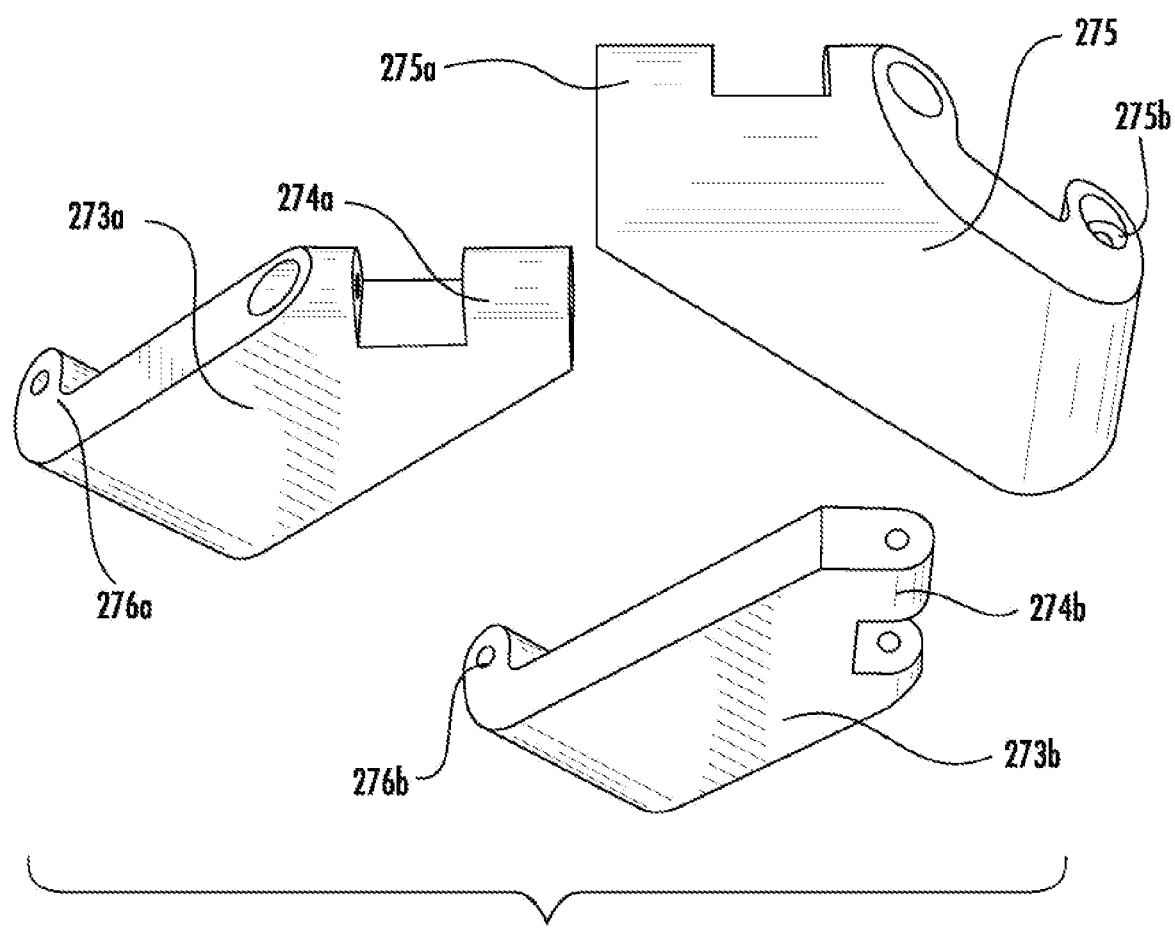
FIG. 23B is an exploded view of the adaptor assembly of FIG. 23A.

FIGS. 23A-23C illustrate another embodiment of an adaptor assembly 270. As shown in FIGS. 23A-23C, the adaptor assembly 270 includes at least one vertical support body 272a, 272b. Features of the vertical support body 272a, 272b are otherwise identical to the vertical support body 172 unless specified herein. The adaptor assembly 270 also includes control members 273a, 273b, which are pivotally attached to the bottom portion of a respective one of the vertical support bodies 272a, 272b. The control members 273a, 273b can be considered pivoting control members based on their pivoting connections to adjacent components or elements. The control members 273a, 273b are each connected to a central connector link 275, in one aspect. The control members 273a, 273b can include bearing surfaces 283a, 283b that are configured to engage or bear against a bottom surface of rocker rails of the carrier 180. The central connector link 275 has a first end 275a pivotally connected to a first one of the control members 273a and a second end pivotally connected to a second one of the control members 273b. The first control member 273a includes a first end 274a that is configured to be pivotally attached to the first end 275a of the central connector link 275. The second control member 273b includes a first end 274b that is configured to be pivotally attached to the second end 275h of the central connector link 275. In one aspect, the first ends 274a, 274b of the control members 273a, 273b are angled. Similarly, the first and second ends 275a, 275b of the central connector link 275 can also be angled.

A second end 276a of the first control member 273a is pivotally attached to the vertical support body 272a. A second end 276b of the second control member 273b is pivotally attached to the vertical support body 272b. In one aspect, the second ends 276a, 276b of the control members 273a, 273b are straight or flat.

Based on the shapes and interactions of the control members 273a, 273b and the central connector link 275, the control members 273a, 273b can be folded downward relative to the vertical support bodies 272a, 272b, and then the control members 273a, 273b can be hinged or folded relative to the central connector link 275. In the unfolded orientation, the vertical support bodies 272a, 272b are arranged at a predetermined distance relative to each other such that the respective latching regions are aligned with plungers on a carrier. The predetermined distance is limited based on the length or shape of the control members 273a, 273b and the central connector link 275. The connections between the control members 273a, 273b and the vertical support bodies 272a, 272b, and the connections between the control members 273a, 273b and the central connector link 275 provide for a multi-axis folding motion. Based on this arrangement, the control members 273a, 273b and the central connector link 275 securely attach the vertical support bodies 272a, 272b relative to a carrier.

Both adaptor assemblies 170, 270 include features or components that prevent the vertical support bodies 172, 272a, 272b from splaying outwards. These features help prevent the plungers of the carrier 180 from being inadvertently disengaged with the vertical support bodies 172, 272a, 272b. In FIGS. 21A and 21B, the bearing surface 174 performs this function by engaging an inner side of one of the carrier rocker rails. In FIGS. 23A-23C, the connections or interfaces between the vertical support bodies 272a, 272b, the control members 273a, 273b, and the central connector link 275 perform this function by limiting a distance or width between the two vertical support bodies 272a, 272b. Generally, the control members are configured to maintain the latching regions in alignment with the carrier plungers and prevent splaying of the vertical support bodies.

In another embodiment, the control members 273a, 273b can be replaced with a flexible connector, such as a strap, band, or tether, that is attached to the vertical support bodies 272a, 272b so as to limit a distance that the vertical support bodies 272a, 272b can be moved away from one another. In one aspect, the flexible connector is non-elastic. In another embodiment, the control members 273a, 273b, and the central connector link 275 can be replaced by a single unitary rigid structure. Limiting the distance between the vertical support bodies prevents inadvertent outward splaying of the vertical support bodies that would otherwise cause the vertical support bodies to disengage from the carrier plungers.

In another aspect, a method of using the adaptor assemblies 170, 270 is also disclosed herein. The method can include engaging the adaptor assemblies 170, 270 with a car seat or carrier in order to provide an interface with a stroller frame. The method can also include folding the adaptor assemblies 170, 270 into a retracted or folded state that is more compact than a use state. The method can also include additional steps implementing the functionality of any one or more of the components of the adaptor assemblies 170, 270.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

The invention claimed is:

1. A foldable stroller frame assembly comprising:
   a handle portion, a front leg portion, and a rear leg portion each pivotally connected to one another by a central frame hub;
   a seat mount connected in a first portion of the seat mount to the central frame hub and connected in a second portion of the seat mount to a linkage connector, wherein the first portion of the seat mount is connected to the central frame hub via an upper track defined on the central frame hub; and a seat mount guide link having a first end connected to the front leg portion and a second end connected to the linkage connector.

2. The foldable stroller frame assembly according to claim 1, wherein the first portion of the seat mount is connected to the central frame hub via an upper track defined on the central frame hub,
- a lower track is defined on the rear leg portion, the lower track being configured to receive a portion of the linkage connector, and
- a longitudinal axis (A1) of the lower track is angled relative to a longitudinal axis (A2) of the upper track.

3. A foldable stroller frame assembly comprising:
- a handle portion, a front leg portion, and a rear leg portion each pivotally connected to one another by a central frame hub;
- a seat mount connected in a first portion of the seat mount to the central frame hub and connected in a second portion of the seat mount to a linkage connector; and
- a seat mount guide link having a first end connected to the front leg portion and a second end connected to the linkage connector,
- further comprising a basket guide link having a first end connected to the linkage connector, and a basket frame link including a first end connected to the rear leg portion and a second end connected to a basket frame, wherein the basket guide link includes a guide slot and a guide connected to the basket frame.

4. The foldable stroller frame assembly according to claim 3, wherein the guide travels from a first end of the guide slot to a second opposite end of the guide slot as the stroller frame assembly is folded.

5. The foldable stroller frame assembly according to claim 3, wherein the basket frame and the basket guide link intersect each other when the stroller frame assembly is folded.

6. The foldable stroller frame assembly according to claim 3, wherein the basket guide link, the basket frame, and the basket frame link are each angled relative to each other when the stroller frame assembly is folded.

7. A foldable stroller frame assembly comprising:
- a handle portion, a front leg portion, and a rear leg portion each pivotally connected to one another by a central frame hub;
- a seat mount connected in a first portion of the seat mount to the central frame hub and connected in a second portion of the seat mount to a linkage connector; and
- a seat mount guide link having a first end connected to the front leg portion and a second end connected to the linkage connector,
- wherein an upper portion of the seat mount includes a bayonet that is configured to be in an extended position when the stroller frame assembly is unfolded, and a retracted position when the stroller frame assembly is folded,
- wherein the bayonet extends a first height that is above the central frame hub in the extended position, and the bayonet extends a second height that is less than the first height in the retracted position.

8. The foldable stroller frame assembly according to claim 7, wherein the bayonet is positioned vertically below an upper surface of the central frame hub when in the retracted position.

9. The foldable stroller frame assembly according to claim 7, wherein the bayonet is offset from the first portion and the second portion of the seat mount.

10. The foldable stroller frame assembly according to claim 7, further comprising a foldable child seat frame that is configured to be supported by the bayonet, wherein the foldable child seat frame is arranged within an outer perimeter defined by the stroller frame assembly when both the foldable child seat frame and the stroller frame assembly are folded.

11. A foldable stroller frame assembly comprising:
- a handle portion, a front leg portion, and a rear leg portion each pivotally connected to one another by a central frame hub;
- a seat mount connected in a first portion of the seat mount to the central frame hub and connected in a second portion of the seat mount to a linkage connector; and
- a seat mount guide link having a first end connected to the front leg portion and a second end connected to the linkage connector,
- wherein a lower track is defined on the rear leg portion, the lower track being configured to receive a portion of the linkage connector.

12. The foldable stroller frame assembly according to claim 11, wherein the lower track is formed with a first linear track section and a second curved track section formed at an end of the first linear track section.

13. The foldable stroller frame assembly according to claim 12, wherein the second curved track section is angled relative to the first linear track section by at least 45 degrees to 85 degrees.

14. A method of folding a stroller frame from an upright position to a folded position, the method comprising:
- folding a handle portion downwards such that the handle portion drives a front leg portion towards a rear leg portion, and
- driving a linkage connector along a track from a curved track portion to a linear track section, the track being defined on the rear leg portion, and the linkage connector being connected to a seat mount defining a bayonet, a seat mount guide link connected to the front leg portion, and a basket guide link.

* * * * *